United States Patent [19]
Easton

[11] Patent Number: 5,764,687
[45] Date of Patent: Jun. 9, 1998

[54] MOBILE DEMODULATOR ARCHITECTURE FOR A SPREAD SPECTRUM MULTIPLE ACCESS COMMUNICATION SYSTEM

[75] Inventor: Kenneth D. Easton, San Diego, Calif.

[73] Assignee: Qualcomm Incorporated, San Diego, Calif.

[21] Appl. No.: 492,592

[22] Filed: Jun. 20, 1995

[51] Int. Cl.⁶ .................. H04B 1/707; H04J 13/04
[52] U.S. Cl. .............. 375/206; 375/349; 370/335
[58] Field of Search .......................... 375/205, 206, 375/347, 349; 370/335, 342, 441, 479

[56] References Cited

U.S. PATENT DOCUMENTS

| | | | |
|---|---|---|---|
| 4,894,842 | 1/1990 | Broekhoven et al. | 375/1 |
| 4,901,307 | 2/1990 | Gilhousen et al. | 370/18 |
| 5,056,109 | 10/1991 | Gilhousen et al. | 375/1 |
| 5,101,501 | 3/1992 | Gilhousen et al. | 455/33 |
| 5,103,459 | 4/1992 | Gilhousen et al. | 375/1 |
| 5,109,390 | 4/1992 | Gilhousen et al. | 375/1 |
| 5,289,499 | 2/1994 | Weerackody | 375/206 |
| 5,361,276 | 11/1994 | Subramanian | 375/1 |
| 5,394,435 | 2/1995 | Weerackody | 375/206 |
| 5,490,165 | 2/1996 | Blakeney, II et al. | 370/335 |
| 5,511,067 | 4/1996 | Miller | 370/335 |
| 5,544,156 | 8/1996 | Teder et al. | 375/206 |
| 5,563,907 | 10/1996 | Lomp | 375/206 |

FOREIGN PATENT DOCUMENTS

| | | | |
|---|---|---|---|
| 9413066 | 6/1994 | WIPO | H04B 1/66 |
| 9512262 | 5/1995 | WIPO | H04J 13/00 |

*Primary Examiner*—Stephen Chin
*Assistant Examiner*—Jeffrey W. Gluck
*Attorney, Agent, or Firm*—Russell B. Miller; Brian S. Edmonston

[57] ABSTRACT

The present invention involves demodulating a signal in a spread spectrum multiple access system employing a pilot on the forward link. The rake receiver separates the signal processing based on the period over which the processing occurs. Symbol rate processing is performed by a single time-shared multiply-accumulate datapath that services multiple finger front ends and a searcher front end. The front ends are dedicated circuits that perform all chip rate processing, producing a data vector and asserting a flag indicating the results are ready to be serviced by the shared datapath. A datapath controller arbitrates use of the datapath between the finger front ends, the searcher front end, and combining functions, configuring the datapath to service them on a first-come, first-serve basis. The controller sequences the datapath through a fixed routine as dictated by the signal processing associated with the block being serviced.

17 Claims, 12 Drawing Sheets

FIG. 9

| ADDR | BANK 0 | BANK 1 | ADDR | BANK 0 | BANK 1 |
|---|---|---|---|---|---|
| 0 | F0 SYMBOL 0 | F0 SYMBOL 1 | 32 | F2 SYMBOL 0 | F2 SYMBOL 1 |
| 1 | F0 SYMBOL 2 | F0 SYMBOL 3 | 33 | F2 SYMBOL 2 | F2 SYMBOL 3 |
| 2 | F0 SYMBOL 4 | F0 SYMBOL 5 | 34 | F2 SYMBOL 4 | F2 SYMBOL 5 |
| 3 | F0 SYMBOL 6 | F0 SYMBOL 7 | 35 | F2 SYMBOL 6 | F2 SYMBOL 7 |
| 4 | F0 FREQ ERR | F0 µP-WR INIT ENERGY | 36 | F2 FREQ ERR | F2 µP-WR INIT ENERGY |
| 5 | F0 PFI_OLD | F0 PFQ_OLD | 37 | F2 PFI_OLD | F2 PFQ_OLD |
| 6 | F0 IN-LOCK THRESH | F0 OUT-LOCK THRESH | 38 | F2 IN-LOCK THRESH | F2 OUT-LOCK THRESH |
| 7 | SCRATCH | | 39 | SCRATCH | |
| 8 | F0 PILOT FILTER I | | 40 | F2 PILOT FILTER I | |
| 9 | F0 PILOT FILTER Q | | 41 | F2 PILOT FILTER Q | |
| 10 | F0 LOCK FILTER ENERGY | | 42 | F2 LOCK FILTER ENERGY | |
| 11 | F0 TIME TRACK FREQ ACC | | 43 | F2 TIME TRACK FREQ ACC | |
| 12 | F0 TIME TRACK PHASE ACC | | 44 | F2 TIME TRACK PHASE ACC | |
| 13 | F0 µP-WR INIT FREQ ACC | | 45 | F2 µP-WR FREQ ACC | |
| 14 | F0 µP-RD LOCK FILTER ENERGY | | 46 | F2 µP-RD LOCK FILTER ENERGY | |
| 15 | F0 µP-RD FREQ ACC | | 47 | F2 µP-RD FREQ ACC | |
| 16 | F1 SYMBOL 0 | F1 SYMBOL 1 | 48 | PWR CTL CELL A SUM | TXGAIN |
| 17 | F1 SYMBOL 2 | F1 SYMBOL 3 | 49 | PWR CTL CELL B SUM | µP-WR TXGAIN |
| 18 | F1 SYMBOL 4 | F1 SYMBOL 5 | 50 | PWR CTL CELL C SUM | µP-RD |
| 19 | F1 SYMBOL 6 | F1 SYMBOL 7 | 51 | | LO_ADJ TXGAIN |
| 20 | F1 FREQ ERR | F1 µP-WR INIT ENERGY | 52 | LO_ADJ | µP-WR LO_ADJ |
| 21 | F1 PFI_OLD | F1 PFQ_OLD | 53 | | µP-RD LO_ADJ |
| 22 | F1 IN-LOCK THRESH | F1 OUT-LOCK THRESH | 54 | ONTIME NON-COHERENT ACC | |
| 23 | SCRATCH | | 55 | LATE NON-COHERENT ACC | |
| 24 | F1 PILOT FILTER I | | 56 | PEAK 0 ENERGY | |
| 25 | F1 PILOT FILTER Q | | 57 | PEAK 1 ENERGY | |
| 26 | F1 LOCK FILTER ENERGY | | 58 | PEAK 2 ENERGY | |
| 27 | F1 TIME TRACK FREQ ACC | | 59 | PEAK 3 ENERGY | |
| 28 | F1 TIME TRACK PHASE ACC | | 60 | | |
| 29 | F1 µP-WR INIT FREQ ACC | | 61 | LOCAL MAX FILTER PRIOR ENERGY | |
| 30 | F1 µP-RD LOCK FILTER ENERGY | | 62 | PEAK 0 OFFSET | PEAK 2 OFFSET |
| 31 | F1 µP-RD FREQ ACC | | 63 | PEAK 1 OFFSET | PEAK 3 OFFSET |

FIG. 10

| CLK | DATA_VEC | REGISTER FILE | c[0] | c[1] | c[2] | c[3] | c[4] | c[5] | c[6] | c[7] | c[11:8] | c[15:12] | c[16] | COMMENTS: |
|---|---|---|---|---|---|---|---|---|---|---|---|---|---|---|
| 0 | | | 1 | 0 | 0 | 0 | 0 | 0 | 0 | 0 | 0 | 0 | 0 | |
| 1 | | RD PFI | 0 | 1 | 0 | 0 | 1 | 1 | 1 | 0 | 0 | 0 | 1 | |
| 2 | ONTIME I | | 1 | 1 | 0 | 0 | 1 | 0 | 0 | 1 | PILOT IIR | 0 | 1 | PFI |
| 3 | | RD PFQ | 0 | 0 | 0 | 0 | 1 | 0 | 0 | 0 | 0 | PILOT IIR | 1 | |
| 4 | | WR PFI | 1 | 1 | 0 | 0 | 0 | 1 | 1 | 1 | PILOT IIR | 0 | 1 | |
| 5 | ONTIME Q | | 0 | 0 | 0 | 0 | 0 | 0 | 0 | 0 | PILOT IIR | PILOT IIR | 1 | PFQ |
| 6 | SYMBOL I | RD PFI | 1 | 1 | 0 | 0 | 0 | 0 | 0 | 1 | 0 | 0 | 0 | SYMBOL I*PFI |
| 7 | | WR PFQ | 0 | 0 | 0 | 1 | 0 | 0 | 0 | 0 | 0 | 0 | 1 | |
| 8 | SYMBOL Q | RD PFQ | 1 | 1 | 0 | 1 | 0 | 0 | 0 | 1 | 0 | 0 | 1 | SYMBOL |
| 9 | | RD PFI_OLD | 0 | 0 | 1 | 0 | 0 | 0 | 0 | 0 | 0 | 0 | 0 | -PFQ*PFI_OLD |
| 10 | | WR SYMBOL n | 1 | 1 | 1 | 0 | 0 | 0 | 0 | 1 | DOT PROD | DOT PROD | 1 | |
| 11 | | RD PFI | 0 | 0 | 0 | 1 | 0 | 0 | 0 | 0 | 0 | 0 | 0 | FREQ_ERR |
| 12 | | RD PFQ_OLD | 1 | 1 | 0 | 1 | 0 | 0 | 0 | 0 | 0 | 0 | 0 | |
| 13 | | RD PFI | 0 | 0 | 1 | 1 | 0 | 0 | 0 | 1 | CROSS PROD | CROSS PROD | 1 | PFI^2 |
| 14 | | WR FREQ_ERR | 1 | 1 | 1 | 1 | 0 | 0 | 0 | 0 | 0 | 0 | 0 | ENERGY |
| 15 | | RD PFQ | 0 | 0 | 0 | 0 | 1 | 0 | 0 | 0 | ENERGY | ENERGY | 1 | |
| 16 | | RD LOCK FILT | 1 | 1 | 0 | 0 | 1 | 0 | 0 | 1 | LOCK FILT IIR | LOCK FILT IIR | 1 | LOCK FILT IIR |
| 17 | | WR ENERGY | 0 | 0 | 0 | 0 | 1 | 0 | 0 | 0 | LOCK FILT IIR | 0 | 1 | IN-LOCK COMP |
| 18 | | RD IN-LOCK | 1 | 1 | 0 | 0 | 1 | 0 | 0 | 1 | 0 | 0 | 0 | OUT-LOCK COMP |
| 19 | | RD OUT-LOCK | 0 | 0 | 1 | 0 | 1 | 0 | 0 | 0 | 0 | 0 | 0 | LATE I^2 |
| 20 | LATE I | WR LOCK FILT | 1 | 1 | 1 | 0 | 1 | 0 | 0 | 1 | 0 | 0 | 1 | LATE I^2 + Q^2 |
| 21 | LATE Q | | 0 | 0 | 0 | 1 | 1 | 1 | 1 | 0 | 0 | 0 | 1 | TT_METRIC |
| 22 | | RD TT_METRIC | 1 | 1 | 0 | 1 | 1 | 0 | 0 | 1 | TT_METRIC | TT_METRIC | 1 | |
| 23 | | | 0 | 0 | 0 | 0 | 0 | 0 | 0 | 0 | 0 | 0 | 0 | |
| 24 | | WR TT_METRIC | 1 | 0 | 0 | 0 | 0 | 0 | 0 | 0 | 0 | 0 | 0 | |
| 25 | | RD TT_METRIC | 0 | 1 | 0 | 0 | 1 | 0 | 0 | 0 | 0 | 0 | 0 | |
| 26 | | RD TT_FREQ | 1 | 1 | 0 | 0 | 1 | 0 | 0 | 0 | TT_FREQ | TT_K1 | 1 | TT_FREQ |
| 27 | | | 0 | 0 | 0 | 0 | 0 | 0 | 0 | 0 | 0 | 0 | 0 | |
| 28 | | WR TT_FREQ | 1 | 0 | 0 | 0 | 0 | 0 | 0 | 0 | 0 | 0 | 0 | |
| 29 | | RD TT_METRIC | 0 | 1 | 0 | 0 | 1 | 0 | 0 | 0 | 0 | 0 | 0 | |
| 30 | | RD TT_PHASE | 1 | 1 | 0 | 0 | 1 | 0 | 0 | 0 | 0 | TT_K2 | 1 | |
| 31 | | RD TT_FREQ | 0 | 0 | 0 | 0 | 0 | 0 | 0 | 0 | 0 | 0 | 0 | |
| 32 | | | 1 | 1 | 0 | 0 | 1 | 0 | 0 | 1 | 0 | 0 | 1 | |
| 33 | | | 0 | 0 | 0 | 0 | 0 | 0 | 0 | 1 | 0 | 0 | 0 | |
| 34 | | WR TT_PHASE | 0 | 0 | 0 | 0 | 0 | 0 | 0 | 0 | 0 | 0 | 0 | TT_PHASE |

| CLK | DATA VEC | REGISTER FILE | c[0] | c[1] | c[2] | c[3] | c[4] | c[5] | c[6] | c[7] | c[11:8] | c[15:12] | c[16] | COMMENTS: |
|---|---|---|---|---|---|---|---|---|---|---|---|---|---|---|
| 0 | LATE I | | 0 | 1 | 0 | 1 | 0 | 0 | 0 | 0 | 0 | 0 | 0 | I^2 LATE |
| 1 | LATE Q | | 1 | 1 | 0 | 1 | 0 | 0 | 0 | 0 | 0 | 0 | 1 | ENERGY LATE |
| 2 | | RD NONCOH LT | 0 | 0 | 0 | 0 | 1 | 0 | 0 | 1 | 0 | NONCOHER | 1 | NONCOHER ACC |
| 3 | | WR NONCOH LT | 0 | 0 | 0 | 0 | 1 | 0 | 0 | 1 | 0 | NONCOHER | 1 | |
| 4 | ONTIME I | | 0 | 1 | 0 | 1 | 0 | 0 | 0 | 0 | 0 | 0 | 1 | I^2 ONTIME |
| 5 | ONTIME Q | | 1 | 1 | 0 | 1 | 0 | 0 | 0 | 0 | 0 | 0 | 1 | ENERGY ONTIME |
| 6 | | RD NONCOH OT | 0 | 0 | 0 | 0 | 1 | 0 | 0 | 1 | 0 | NONCOHER | 1 | NONCOHER ACC |
| 7 | | WR NONCOH OT | 0 | 0 | 0 | 0 | 1 | 0 | 0 | 1 | 0 | NONCOHER | 1 | |
| 8 | | | 0 | 0 | 0 | 0 | 0 | 0 | 0 | 0 | 0 | 0 | 1 | |
| 9 | | RD NONCOH LT | 1 | 1 | 0 | 0 | 1 | 1 | 1 | 0 | 0 | 0 | 1 | LOC MAX COMP |
| 10 | | RD LAST LT | 1 | 1 | 0 | 0 | 1 | 1 | 1 | 0 | 0 | 0 | 0 | LOC MAX COMP |
| 11 | | | 0 | 0 | 0 | 0 | 0 | 1 | 1 | 0 | 0 | 0 | 0 | SEL INPUT PEAK |
| 12 | | RD PEAK 0 | 1 | 1 | 0 | 0 | 1 | 1 | 1 | 0 | 0 | 0 | 0/1 | PEAK 0 COMP |
| 13 | | | 0 | 0 | 0 | 0 | 0 | 1 | 1 | 0 | 0 | 0 | 0 | |
| 14 | | COND WR PEAK 0 | 0 | 0 | 0 | 0 | 0 | 1 | 1 | 0 | 0 | 0 | 0/1 | |
| 15 | | RD PEAK 1 | 1 | 1 | 0 | 0 | 1 | 1 | 1 | 0 | 0 | 0 | 0 | PEAK 1 COMP |
| 16 | | | 0 | 0 | 0 | 0 | 0 | 1 | 1 | 0 | 0 | 0 | 0 | |
| 17 | | COND WR PEAK 1 | 0 | 0 | 0 | 0 | 0 | 1 | 1 | 0 | 0 | 0 | 0/1 | |
| 18 | | RD PEAK 2 | 1 | 1 | 0 | 0 | 1 | 1 | 1 | 0 | 0 | 0 | 0 | PEAK 2 COMP |
| 19 | | | 0 | 0 | 0 | 0 | 0 | 1 | 1 | 0 | 0 | 0 | 0 | |
| 20 | | COND WR PEAK 2 | 0 | 0 | 0 | 0 | 0 | 1 | 1 | 0 | 0 | 0 | 0/1 | |
| 21 | | RD PEAK 3 | 1 | 1 | 0 | 0 | 1 | 1 | 1 | 0 | 0 | 0 | 0 | PEAK 3 COMP |
| 22 | | | 0 | 0 | 0 | 0 | 0 | 1 | 1 | 0 | 0 | 0 | 0 | |
| 23 | | COND WR PEAK 3 | 0 | 0 | 0 | 0 | 0 | 1 | 1 | 0 | 0 | 0 | 0 | |

| CLK | REGISTER FILE | c[0] | c[1] | c[2] | c[3] | c[4] | c[5] | c[6] | c[7] | c[11:8] | c[15:12] | c[16] | COMMENTS: |
|---|---|---|---|---|---|---|---|---|---|---|---|---|---|
| 0 | RD F0 SYMBOL n | 1 | 1 | 0 | 0 | 0 | 0 | 0 | 0 | | | 0 | |
| 1 | RD F1 SYMBOL n | 1 | 1 | 0 | 0 | 1 | 0 | 0 | 0 | | | 1 | |
| 2 | RD F2 SYMBOL n | 1 | 1 | 0 | 0 | 1 | 0 | 0 | 1 | | | 1 | |
| 3 | | 0 | 0 | 0 | 0 | 1 | 0 | 0 | 0 | SYMBCOMB | SYMBCOMB | 1 | SYMB_DATA |
| 4 | RD F0 SYMBOL n | 1 | 1 | 0 | 0 | 0 | 0 | 0 | 0 | 0 | 0 | 0 | |
| 5 | RD F1 SYMBOL n | 1 | 1 | 0 | 0 | 1 | 0 | 0 | 0 | 0 | 0 | 1 | |
| 6 | RD F2 SYMBOL n | 1 | 1 | 0 | 0 | 1 | 0 | 0 | 1 | 0 | 0 | 1 | |
| 7 | RD CELL 0 SUM | 1 | 1 | 0 | 0 | 1 | 0 | 0 | 0 | PWRCOMB | PWRCOMB | 1 | CELL 0 DECISION |
| 8 | | 0 | 0 | 0 | 0 | 0 | 0 | 0 | 1 | 0 | 0 | 0 | |
| 9 | RD F0 SYMBOL n | 1 | 1 | 0 | 0 | 1 | 0 | 0 | 0 | 0 | 0 | 1 | |
| 10 | RD F1 SYMBOL n | 1 | 1 | 0 | 0 | 1 | 0 | 0 | 0 | 0 | 0 | 1 | |
| 11 | RD F2 SYMBOL n | 1 | 1 | 0 | 0 | 1 | 0 | 0 | 1 | 0 | 0 | 1 | |
| 12 | RD CELL 1 SUM | 1 | 1 | 0 | 0 | 1 | 0 | 0 | 0 | PWRCOMB | PWRCOMB | 1 | CELL 1 |
| 13 | | 0 | 0 | 0 | 0 | 0 | 0 | 0 | 1 | 0 | 0 | 0 | |
| 14 | RD F0 SYMBOL n | 1 | 1 | 0 | 0 | 1 | 0 | 0 | 0 | 0 | 0 | 1 | |
| 15 | RD F1 SYMBOL n | 1 | 1 | 0 | 0 | 1 | 0 | 0 | 0 | 0 | 0 | 1 | |
| 16 | RD F2 SYMBOL n | 1 | 1 | 0 | 0 | 1 | 0 | 0 | 1 | 0 | 0 | 1 | |
| 17 | RD CELL 2 SUM | 1 | 1 | 0 | 0 | 1 | 0 | 0 | 0 | PWRCOMB | PWRCOMB | 1 | CELL 2 DECISION |
| 18 | RD | 1 | 1 | 0 | 0 | 1 | 0 | 0 | 1 | 0 | 0 | 1 | |
| 19 | RD "1" | 1 | 1 | 0 | 0 | 0 | 0 | 0 | 1 | TXGAI | TXGAI | 1 | TXGAI |
| 20 | WR | 1 | 1 | 0 | 0 | 0 | 0/1 | 0/1 | 0 | 0 | 0 | 0 | |
| 21 | | 0 | 0 | 0 | 0 | 0 | 0 | 0 | 0 | 0 | 0 | 0 | |
| 22 | RD F0 FREQ_ERR n | 1 | 1 | 0 | 0 | 1 | 0 | 0 | 0 | 0 | 0 | 1 | |
| 23 | RD F1 FREQ_ERR n | 1 | 1 | 0 | 0 | 1 | 0 | 0 | 0 | 0 | 0 | 1 | |
| 24 | RD F2 FREQ_ERR n | 1 | 1 | 0 | 0 | 1 | 0 | 0 | 1 | 0 | 0 | 1 | |
| 25 | RD LO_ADJ | 1 | 1 | 0 | 0 | 0 | 0 | 0 | 0 | FREQCOMB | FREQCOMB | 1 | FREQ_COMB |
| 26 | | 0 | 0 | 0 | 0 | 1 | 0 | 0 | 1 | LO_ADJ | LO_ADJ | 1 | LO_ADJ |
| 27 | WR LO_ADJ | 0 | 0 | 0 | 0 | 0 | 0 | 0 | 0 | 0 | 0 | 0 | |

MOBILE DEMODULATOR ARCHITECTURE FOR A SPREAD SPECTRUM MULTIPLE ACCESS COMMUNICATION SYSTEM

BACKGROUND OF THE INVENTION

I. Field of the Invention

This invention relates generally to spread spectrum communication systems and, more particularly, to signal processing in a cellular telephone communication system.

II. Description of the Related Art

In a wireless radiotelephone communication system, many users communicate over a wireless channel to connect to wireline telephone systems. Communication over the wireless channel can be one of a variety of multiple access techniques that allow a large number of users in a limited frequency spectrum. These multiple access techniques include time division multiple access (TDMA), frequency division multiple access (FDMA), and code division multiple access (CDMA).

The CDMA technique has many advantages. An exemplary CDMA system is described in U.S. Pat. No. 4,901,307, entitled Spread Spectrum Multiple Access Communication System Using Satellite or Terrestrial Repeaters, issued Feb. 13, 1990 and assigned to the assignee of the present invention.

In the '307 patent, a multiple access technique is disclosed where a large number of mobile telephone system users, each having a transceiver, communicate through satellite repeaters or terrestrial base stations using CDMA spread spectrum communication signals. The base station-to-mobile station signal transmission path is referred to as the forward link and the mobile station-to-base station signal transmission path is referred to as the reverse link.

In using CDMA communications, the frequency spectrum can be reused multiple times thus permitting an increase in system user capacity. Each base station provides coverage to a limited geographic area and links the mobile stations in its coverage area through a cellular system switch to the public switched telephone network (PSTN). When a mobile station moves to the coverage area of a new base station, the routing of that user's call is transferred to the new base station.

The CDMA modulation techniques discussed in the '307 patent and in U.S. Pat. No. 5,102,459 entitled System and Method For Generating Signal Waveforms in a CDMA Cellular Telephone System, issued Jun. 25, 1990 and assigned to the assignee of the present invention, mitigate the special problems of the terrestrial channel, such as multipath and fading. Instead of being a drawback, as it is with narrowband systems, separable multipath can be diversity combined in a mobile rake receiver for enhanced modem performance. In the mobile radio channel, multipath is created by reflection of the signal from obstacles in the environment, such as buildings, trees, cars, and people. In general the mobile radio channel is a time varying multipath channel due to the relative motion of the structures that create the multipath. For example, if an ideal impulse is transmitted over the time varying multipath channel, the received stream of pulses would change in time location, attenuation, and phase as a function of the time that the ideal impulse was transmitted.

The multipath properties of the terrestrial channel produce, at the receiver, signals having traveled several distinct propagation paths. One characteristic of a multipath channel is the time spread introduced in a signal that is transmitted through the channel. The spread spectrum pseudonoise (PN) modulation used in a CDMA system allows different propagation paths of the same signal to be distinguished and combined, provided the difference in path delays exceeds the PN chip duration. If a PN chip rate of approximately 1 MHz is used in a CDMA system, the full spread spectrum processing gain, equal to the ratio of the spread bandwidth to the system data rate, can be employed against paths having delays that differ by more than one microsecond. A one microsecond path delay differential corresponds to a differential path distance of approximately 300 meters. The urban environment typically provides differential path delays in excess of one microsecond.

Another characteristic of the multipath channel is that each path through the channel may cause a different attenuation factor. For example, if an ideal impulse is transmitted over a multipath channel, each pulse of the received stream of pulses generally has a different signal strength from other received pulses.

Yet another characteristic of the multipath channel is that each path through the channel may cause a different phase on the signal. If, for example, an ideal impulse is transmitted over a multipath channel, each pulse of the received stream of pulses generally has a different phase from other received pulses. This can result in signal fading.

A fade occurs when multipath vectors are added destructively, yielding a received signal that is smaller than either individual vector. For example, if a sine wave is transmitted through a multipath channel having two paths where the first path has an attenuation factor of X dB, a time delay of d with a phase shift of Q radians, and the second path has an attenuation factor of X dB, a time delay of d with a phase shift of Q+p radians, no signal would be received at the output of the channel.

As described above, the PN chip interval defines the minimum separation two paths must have in order to be combined. Before the distinct paths can be demodulated, the relative arrival times (or offsets) of the paths in the received signal must first be determined. The demodulator performs this function by "searching" through a sequence of offsets and measuring the energy received at each offset. If the energy associated with a potential offset exceeds a certain threshold, a demodulation element, or "finger" may be assigned to that offset. The signal present at that path offset can then be summed with the contributions of other fingers at their respective offsets.

A method and apparatus of finger assignment based on searcher and finger energy levels is disclosed in co-pending U.S. patent application. This application is Ser. No. 08/144, 902 entitled Finger Assignment in a System Capable of Receiving Multiple Signals, filed Oct. 28, 1993, now U.S. Pat. No. 5,490,165, and assigned to the assignee of the present invention.

FIG. 1 shows an exemplary set of signals from a base station arriving at the mobile station. The vertical axis represents the power received on a decibel (dB) scale. The horizontal axis represents the delay in the arrival time of a signal due to multipath delays. The axis (not shown) going into the page represents a segment of time. Each signal spike in the common plane of the page has arrived at a common time but was transmitted by the base station at a different time.

In a common plane, peaks to the right were transmitted at an earlier time by the base station than peaks to the left. For example, the left-most peak spike 2 corresponds to the most recently transmitted signal. Each signal spike 2–7 has traveled a different path and therefore exhibits a different time delay and a different amplitude response.

The six different signal spikes represented by spikes 2–7 are representative of a severe multipath environment. Typical urban environments produce fewer usable paths. The noise floor of the system is represented by the peaks and dips having lower energy levels.

The task of the searcher is to identify the delay as measured by the horizontal axis of signal spikes 2–7 for potential finger assignment. The task of the finger is to demodulate one of a set of the multipath peaks for combination into a single output. It is also the task of a finger, once assigned to a multipath peak, to track that peak as it may move in time.

The horizontal axis can also be thought of as having units of PN offset. At any given time, the mobile station receives a variety of signals from a base station, each of which has traveled a different path and may have a different delay from the others. The base station's signal is modulated by a PN sequence. A local copy of the PN sequence is also generated at the mobile station. Also at the mobile station, each multipath signal is individually demodulated with a PN sequence code aligned to its received time offset. The horizontal axis coordinates can be thought of as corresponding to the PN sequence code offset that would be used to demodulate a signal at that coordinate.

Note that each of the multipath peaks varies in amplitude as a function of time, as shown by the uneven ridge of each multipath peak. In the limited time shown, there are no major changes in the multipath peaks. Over a more extended time range, multipath peaks disappear and new paths are created as time progresses. The peaks can also slide to earlier or later offsets as the path distances change when the mobile station moves around in the base station's area of coverage. Each finger tracks these small variations in the signal assigned to it.

In narrowband systems, the existence of multipath in the radio channel can result in severe fading across the narrow frequency band being used. Such systems are capacity constrained by the extra transmit power needed to overcome a deep fade. As noted above, CDMA signal paths may be discriminated and diversity combined in the demodulation process.

Three major types of diversity exist: time diversity, frequency diversity, and space/path diversity. Time diversity can best be obtained by the use of repetition, time interleaving, and error correction and detection coding that introduce redundancy. A system may employ each of these techniques as a form of time diversity.

CDMA, by its inherent wideband nature, offers a form of frequency diversity by spreading the signal energy over a wide bandwidth. The frequency selective fading that can cause a deep fade across a narrowband system's frequency bandwidth usually only affects a fraction of the frequency band employed by the CDMA spread spectrum signal.

The rake receiver provides path diversity through its ability to combine multipath delayed signals; all paths that have a finger assigned to them must fade together before the combined signal is degraded. Additional path diversity is obtained through a process known as "soft hand-off" in which multiple simultaneous, redundant links from two or more base stations can be established with the mobile station. This supports a robust link in the challenging environment at the cell boundary region. Examples of path diversity are illustrated in U.S. Pat. No. 5,101,501 entitled Soft Hand-Off in a CDMA Cellular Telephone System, issued Mar. 21, 1992 and U.S. Pat. No. 5,109,390 entitled Diversity Receiver in a CDMA Cellular Telephone System, issued Apr. 28, 1992, both assigned to the assignee of the present invention.

Both the cross-correlation between different PN sequences and the autocorrelation of a PN sequence, for all time shifts other than zero, have a nearly zero average value. This allows the different user signals to be discriminated upon reception. Autocorrelation and cross-correlation require that logical "0" take on a value of "1" and logical "1" take on a value of "−1", or a similar mapping, in order that a zero average value be obtained.

However, such PN signals are not orthogonal. Although the cross-correlation essentially averages to zero over the entire sequence length for a short time interval, such as an information bit time, the cross-correlation is a random variable with a binomial distribution. As such, the signals interfere with each other in much the same manner as if they were wide bandwidth Gaussian noise at the same power spectral density.

It is well known in the art that a set of n orthogonal binary sequences, each of length n, for n any power of 2 can be constructed (see *Digital Communications with Space Applications*, S. W. Golomb et al., Prentice-Hall, Inc., 1964, pp. 45–64). In fact, orthogonal binary sequence sets are also known for most lengths that are multiples of four and less than two hundred. One class of such sequences that is easy to generate is called the Walsh function; a Walsh function of order n can be defined recursively as follows:

$$W(n) = \begin{vmatrix} W(n/2), & W(n/2) \\ W(n/2), & W'(n/2) \end{vmatrix} \quad (1)$$

where W' denotes the logical complement of W, and W(1) =|0|.

A Walsh sequence or code is one of the rows of a Walsh function matrix. A Walsh function matrix of order n contains n sequences, each of length n Walsh chips. A Walsh function matrix of order n (as well as other orthogonal functions of length n) has the property that over the interval of n bits, the cross-correlation between all the different sequences within the set is zero. Every sequence in the set differs from every other sequence in exactly half of its bits. It should also be noted that there is always one sequence containing all zeroes and that all the other sequences contain half ones and half zeroes.

In the system described in the '459 patent, the call signal begins as a 9600 bit per second information source which is then converted by a rate ½ forward error correction encoder to a 19,200 symbols per second output stream. Each call signal broadcast from a cell is covered with one of sixty-four orthogonal Walsh sequences, each sixty-four Walsh chips, or one symbol, in duration. Regardless of the symbol being covered, the orthogonality of all Walsh sequences ensures that all interference from other user signals in that cell are canceled out during symbol integration. The non-orthogonal interference from other cells limits capacity on the forward link.

All user signals transmitted by a base station are quadrature phase shift key (QPSK) spread using the same in-phase (I) channel PN sequence and quadrature (Q) channel PN sequence. Each base station in a CDMA system transmits in the same frequency band using the same PN sequence, but with a unique offset relative to an unshifted PN sequence aligned to a universal time reference. The PN spreading rate is the same as the Walsh cover rate, 1.2288 MHz, or 64 PN chips per symbol. In the preferred embodiment, each base station transmits a pilot reference.

The pilot channel is a "beacon" transmitting a constant zero symbol and spread with the same I and Q PN sequences used by the traffic bearing signals. In the preferred embodiment, the pilot channel is covered with the all zero Walsh sequence 0. During initial system acquisition the mobile searches all possible shifts of the PN sequence and once it has found a base station's pilot, it can then synchronize itself to system time. As detailed below, the pilot plays a fundamental role in the mobile demodulator rake receiver architecture well beyond its use in initial synchronization.

FIG. 2 depicts a radio's generic rake receiver demodulator 10 for receiving and demodulating the forward link signal 20 arriving at the antenna 18. The analog transmitter and receiver 16 contain a QPSK downconverter chain that outputs digitized I and Q channel samples 32 at baseband. The sampling clock, CHIPX8 40, used to digitize the received waveform, is derived from a voltage controlled temperature compensated local oscillator (TCXO).

The demodulator 10 is supervised by a microprocessor 30 through the databus 34. Within the demodulator, the I and Q samples 32 are provided to a plurality of fingers 12a–c and a searcher 14. The searcher 14 searches out windows of offsets likely to contain multipath signal peaks suitable for assignment of fingers 12a–c. For each offset in the search window, the searcher 14 reports the pilot energy it found at that offset to the microprocessor. The fingers 12a–c are then surveyed, and those unassigned or tracking weaker paths are assigned by the microprocessor 30 to offsets containing stronger paths identified by searcher 14.

Once a finger 12a–c has locked onto the multipath signal at its assigned offset it then tracks that path on its own until the path fades away or until it is reassigned using its internal time tracking loop. This finger time tracking loop measures energy on either side of the peak at the offset at which the finger is currently demodulating. The difference between these energies forms a metric which is then filtered and integrated.

The output of the integrator controls a decimator that selects one of the input samples over a chip interval to use in demodulation. If a peak moves, the finger adjusts its decimator position to move with it. The decimated sample stream is then despread with the PN sequence consistent with the offset to which the finger is assigned. The despread I and Q samples are summed over a symbol to produce a pilot vector ($P_I$, $P_Q$). These same despread I and Q samples are Walsh uncovered using the Walsh code assignment unique to the mobile user and the uncovered, despread I and Q samples are summed over a symbol to produce a symbol data vector ($D_I$, $D_Q$). The dot product operator is defined as $$P(n) \cdot D(n) = P_I(n)D_I(n) + P_Q(n)D_Q(n) \qquad (2)$$

where $P_I(n)$ and $P_Q(n)$ are respectively the I and Q components of the pilot vector P for symbol n and $D_I(n)$ and $D_Q(n)$ are respectively the I and Q components of the data vector D for symbol n.

Since the pilot signal vector is much stronger than the data signal vector it can be used as an accurate phase reference for coherent demodulation; the dot product computes the magnitude of the data vector component in phase with the pilot vector. As described in co-pending U.S. application Ser. No. 07/981,034 entitled Pilot Carrier Dot Product Circuit, now abandoned, and assigned to the assignee of the present invention, the dot product weights the finger contributions for efficient combining, in effect scaling each finger symbol output 42a–c by the relative strength of the pilot being received by that finger. Thus the dot product performs the dual role of both phase projection and finger symbol weighting needed in a coherent rake receiver demodulator.

Each finger has a lock detector circuit that masks the symbol output 24 to the combiners 22 and 24 if its long term average energy does not exceed a minimum threshold. This ensures that only fingers tracking a reliable path will contribute to the combined output, thus enhancing demodulator performance.

Due to the relative difference in arrival times of the paths to which each finger 12a–c is assigned, each finger 12a–c has a deskew buffer that aligns the finger symbol streams 42a–c so that the symbol combiner 22 can sum them together to produce a "soft decision" demodulated symbol. This symbol is weighted by the confidence that it correctly identifies the originally transmitted symbol. The symbols are sent to a deinterleaver/decoder circuit 28 that first frame deinterleaves and then forward error correction decodes the symbol stream using the maximum likelihood Viterbi algorithm. The decoded data is then made available to the microprocessor 30 or to other components, such as a speech vocoder, for further processing.

On the reverse link, to maximize system capacity, it is important that all signals from mobiles are received at the cell at the same signal strength. A closed loop power control method, disclosed in U.S. Pat. No. 5,056,109 entitled Method and Apparatus for Controlling Transmission Power in a CDMA Cellular Mobile Telephone System, issued Oct. 8, 1991 and assigned to the assignee of the present invention, is employed.

The closed loop power control method operates by the cell measuring the signal being received by the mobile and sending a command to the mobile to increase or decrease its power level on a punctured sub-channel on the forward link. A power control symbol combiner 24 extracts these punctured symbols on the forward link, summing the symbol outputs from the fingers 42a–c, and making a hard decision whether or not to adjust power up or down. These decisions are integrated to provide a transmit gain reference level output, TXGAIN 38, to the transmit power amplifier in the analog transmitter and receiver 16.

To demodulate correctly, a mechanism is needed to align the local oscillator frequency with the clock used at the cell to modulate the data. Each finger makes an estimate of the frequency error by measuring the rotation rate of the pilot vector in QPSK I, Q space using the cross product vector operator:

$$P(n) \times P(n-1) = P_I(n)P_Q(n-1) - P_I(n-1)P_Q(n) \qquad (3)$$

The frequency error estimates from each finger 44a–c are combined and integrated in frequency error combiner 26. The integrator output, LO_ADJ 36, is then fed to the voltage control of the TCXO in the analog transmitter and receiver 16 to adjust the clock frequency of the CHIPX8 clock 40, thus providing a closed loop mechanism for compensating for the frequency error of the local oscillator.

In a typical dedicated circuit implementation of the mobile rake receiver demodulator, each of the fingers, the searcher, and combiners are implemented separately as discrete circuits with each having a direct correspondence to some circuit area on an integrated circuit (IC) die. Each of these blocks are self-contained and responsible for their own signal processing tasks and, as such, the blocks in turn have their own separate accumulators, multipliers, and comparators. These dedicated circuits, especially the numerous multiply-accumulators needed for each finger, require a large amount of die area to implement.

In a typical digital signal processor (DSP) implementation of the demodulator, each of the fingers, the searcher, and combiners are implemented as separately coded subroutines in a demodulator task. There are many simple operations that must be performed in the fingers and the searcher at the PN chip rate. A general DSP architecture may need to execute up to 75 million instructions per second (MIPS) to perform the chip rate processing for the three fingers and the searcher of FIG. 2 in a system using a PN chip rate of 1.2288 MHz as in the preferred embodiment. A 75 MIPS DSP consumes a considerable amount of power. Power is at a premium in the mobile unit, which is often a hand-held consumer device. One significant advantage of the DSP approach is the flexibility of implementing demodulation algorithm changes through a firmware change compared to making physical circuit changes as is the case with the traditional dedicated circuit approach.

Both the dedicated circuit and the general DSP implementations have their respective die area and power concerns, which are not resolved even after taking advantage of the feature size shrink in the latest IC fabrication processes. There is a resulting need for a more efficient demodulator.

SUMMARY OF THE INVENTION

The present invention encompasses a method and apparatus for demodulating a signal in a spread spectrum multiple access communication system employing a pilot on the forward link. The demodulator architecture embodied in this invention results in a smaller area chip consuming less power and costing less than either a dedicated circuit or a general DSP implementation equivalent.

The dedicated symbol rate circuits, a majority of the area required to implement a finger or searcher using the traditional dedicated circuit approach, are removed from the fingers and searcher, their symbol rate functionality having been incorporated into the shared datapath processing. What remains, termed a finger front end or searcher front end to distinguish from the original finger and searcher, are dedicated circuits performing all chip rate processing associated with the finger or searcher respectively.

The present invention separates the signal processing functions into two groups based on the period over which the processing occurs. Specifically, this new architecture uses a single time-shared multiply-accumulate (MAC) datapath that services a plurality of finger front ends and a searcher front end. The datapath performs all symbol rate processing associated with the fingers and the searcher.

This same datapath combines, at the symbol rate, the outputs of the fingers. This produces a demodulated symbol stream and a power control sub-channel decision stream that are used to control the transmit power on the reverse link, and a frequency error estimate used to adjust the local oscillator. In conjunction with the datapath, a small register file RAM stores all state information for signal processing operations that span more than a symbol.

Once per symbol for the fingers or once per integration period for the searcher, the front ends produce a data vector consisting of the I and Q symbol integration results for the pilot, the traffic channel symbol data, and the pilot demodulated half a chip offset from the current finger offset for time tracking, or in the case of the searcher, the I and Q integration for the pilot for each of the offsets being evaluated simultaneously. These outputs are buffered so that the datapath may have access to the accumulated data vector during one symbol while the front end accumulators are summing the data vector for the next symbol. Along with the data vector, the front ends assert a flag indicating they have produced results that need to be serviced by the shared datapath.

A datapath control circuit arbitrates the use of the datapath among the finger front ends, the searcher front end, and the combining functions, on a first-come, first-serve basis. Once queued, the controller sequences the datapath through a fixed routine, selecting components of the data vector being operated on along with the state information stored in the register file RAM. The controller then configures the datapath to perform all of the accumulation, multiplication, and comparisons associated with the signal processing of the block being serviced.

BRIEF DESCRIPTION OF THE DRAWINGS

FIG. 9 is a memory map of state information associated with the symbol rate signal processing of the demodulator.

FIG. 10 is a sequencing timeline of the shared datapath while it services a finger.

FIG. 11 is a sequencing timeline of the shared datapath while it services the searcher.

FIG. 12 is a sequencing timeline of the shared datapath while it services the combiners.

DESCRIPTION OF THE PREFERRED EMBODIMENT

Figure 2:
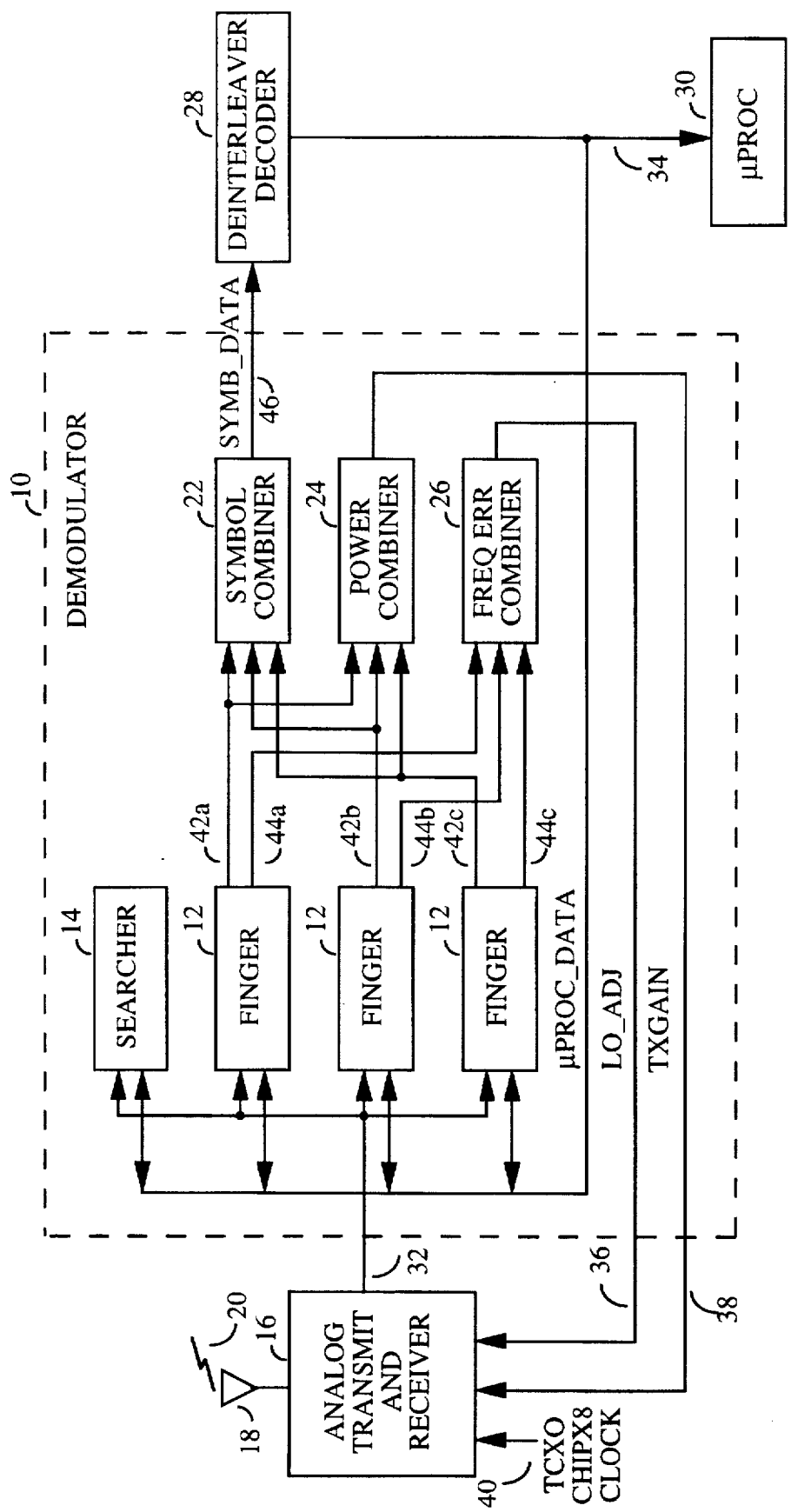
FIG. 2 is a prior art block diagram of a mobile demodulator rake receiver.

As previously discussed, FIG. 2 is a top level functional overview of a rake receiver demodulator 10. The analog transmitter and receiver 16 receives the forward link signal 20 via an antenna 18, downconverts it to baseband and outputs digitized I and Q channel samples 32 to a plurality of fingers 12a–c and a searcher 14. The searcher 14 searches out windows of offsets likely to contain multipath signal peaks suitable for assignment of the fingers 12a–c. For each offset in the search window, the searcher 14 reports the pilot energy it found at that offset to the microprocessor 30. The fingers 12a–c are then surveyed and those unassigned or tracking weaker paths are assigned by the microprocessor 30 to offsets containing stronger paths identified by the searcher 14.

Figure 3:
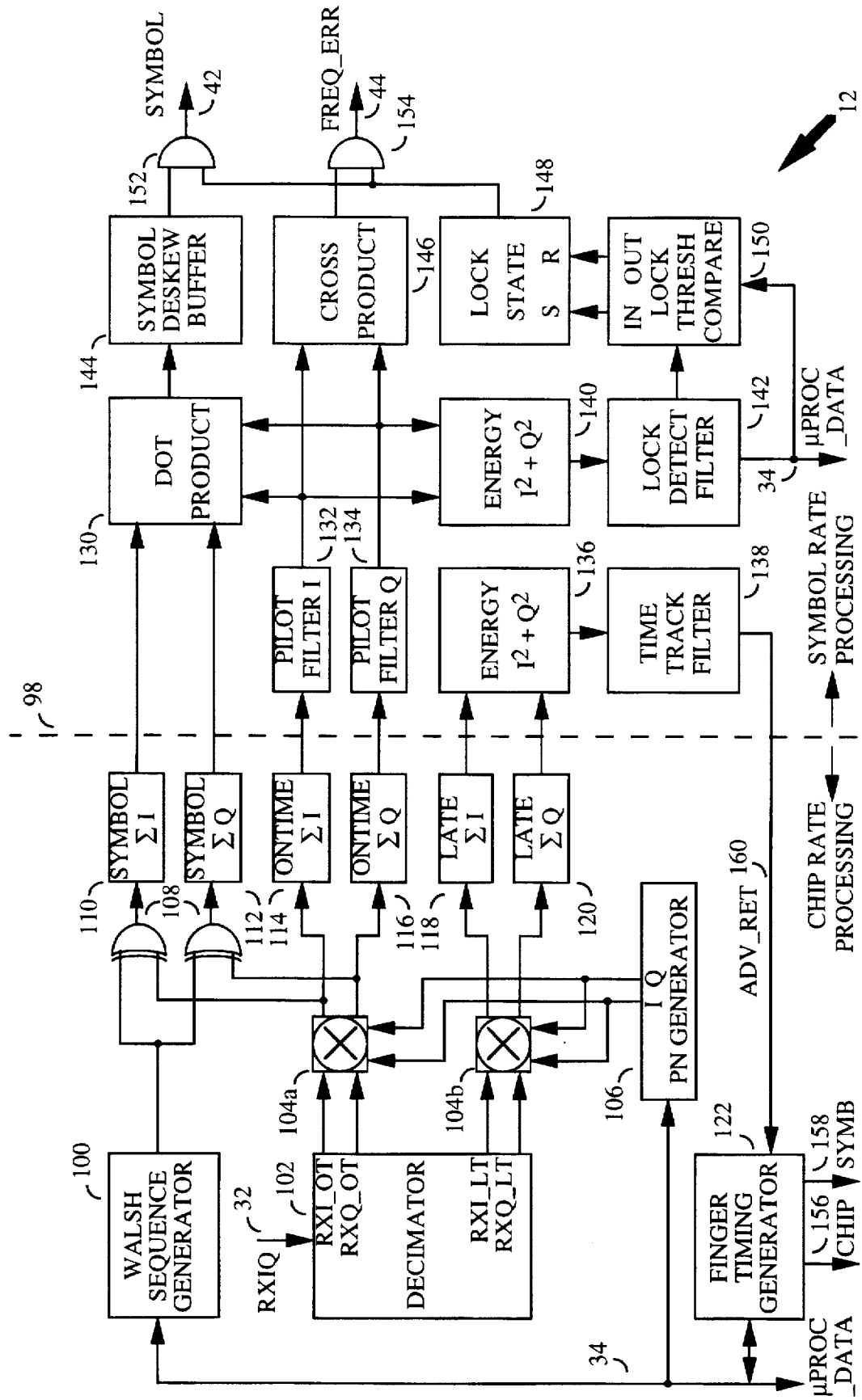
FIG. 3 is a block diagram of the finger functionality.

All of the fingers 12a–c contain the same functionality depicted in the finger functional block diagram of FIG. 3. In a traditional dedicated circuit implementation, each of the elements in FIG. 3 has a correspondence to a physical circuit; in a traditional general purpose DSP implementation, each of these elements have corresponding steps in the signal processing code. In the preferred embodiment, a clear delineation between the processing occurring at chip rate and that at symbol rate is made as indicated by chip-symbol processing boundary 98. All elements operating on the chip level are shown to the left of boundary 98, and all elements operating at the symbol rate are shown to the right of boundary 98.

The I and Q samples 32 are input to a decimator 102 that, based on the finger's assigned offset, selects one of the eight samples per chip to use for on-time processing and another sample half a chip delayed for use in time tracking. This sampling, as well as all other chip rate processing in the finger, is slaved to the chip enable strobe 156 from a finger timing generator 122. The finger timing generator 122 tracks the time offset of the multipath peak being demodulated.

Each advance or retard generated, either due to a time tracking loop adjustment or a slew command by the microprocessor to move to a new offset, has the effect of slowing down or speeding up the rate at which the chip enable strobe 156 is generated, and the related symbol enable strobe 158 that in the preferred embodiment asserts with every sixty-fourth chip enable strobe 156. The finger timing generator reflects any offset changes by incrementing or decrementing an internal finger position register read by the microprocessor. The finger timing generator 122 also contains an internal position assignment register written by the microprocessor to slew the finger to a new offset during finger reassignment. When the microprocessor reassigns a finger, an internal mechanism in the finger timing generator 122 continues to advance or retard the timing until it determines that the finger has reached its assigned offset.

The decimated on-time and late I and Q chip samples are provided to QPSK despreaders 104a and 104b respectively. The despreaders 104 also receive, from the I Q PN sequence generator 106, the PN sequences identical to those used to spread the data at the base station. The I Q PN sequence generator 106 is slaved to the chip enable output 156 from the finger timing generator 122, and is thus generating the PN sequences consistent with the assigned offset of the finger. Another way of describing this is that the sequences output from the PN generator 106 are delayed from their counterpart sequences in the base station by the multipath propagation delay from the base station to the mobile unit. Therefore, the despreading process in the demodulator can reverse the spreading process in the modulator with the correct time alignment.

In order to recover the originally transmitted data, despread I and Q chips are respectively output from on-time despreader 104a to exclusive-or (XOR) gates 108. The Walsh sequence generator 100 provides to the XOR gates 108 the Walsh chip sequence corresponding to the Walsh code assigned to the mobile unit to reverse the orthogonal covering applied at the base station.

The Walsh code is conveyed to the finger through microprocessor databus 34. The despread and uncovered I and Q chips are summed by I and Q symbol accumulators 110 and 112 over a symbol interval, once per symbol, producing a symbol data pair $D_I(n)$ and $D_Q(n)$ for symbol n. Since the pilot channel is covered with the all zeroes Walsh code 0, no separate Walsh sequence generator is needed to recover the pilot. The output of on-time despreader is directly summed by on-time I and Q accumulators 114 and 116, producing a pilot pair $P_I(n)$ and $P_Q(n)$ for symbol n.

The time tracking loop is driven by the difference of pilot strengths offset half a chip from the current finger offset. Therefore, a separate set of I and Q accumulators 118 and 120 sums the despread pilot provided by late despreader 104b using samples delayed half a chip from those used by the on-time pilot and symbol accumulators. To produce a pilot pair half a chip delayed from the on-time pilot pair, $P_{IL}(N)$ and $P_{QL}(N)$ for symbol n, late despreader 104b uses the same PN sequence used by on-time despreader 104a. To produce a pilot pair half a chip advanced from the on-time pilot pair, $P_{IE}(n)$ and $P_{QE}(n)$ for symbol n, late despreader 104b uses a PN sequence delayed a chip from that used by despreader 104a. The time tracking loop makes use of the half chip advanced and delayed pilot pairs on alternating symbols. With each symbol enable strobe 158, the accumulators 110, 112, 114, 116, 118, 120 are cleared and begin summing over the next symbol interval. The elements described above perform all of the chip rate processing occurring in the finger, drawn in FIG. 3 to the left of boundary 98. The net result of this chip rate processing is a data vector produced once per symbol:

$$\{D_I(n), D_Q(n), P_I(n), P_Q(n), P_{IE/L}(n), P_{QE/L}(n)\}$$

which is then processed at the symbol rate by elements drawn to the right of boundary 98 in FIG. 3.

The symbol rate processing typically starts by filtering the on-time I and Q pilot data $P_I(n)$, $P_Q(n)$, as shown by I and Q Pilot filters 132 and 134 in FIG. 3. This filtering smoothes the symbol to symbol variations in the pilot reference, providing a steadier reference for the dot product's phase projection and scaling operations.

In the preferred embodiment, I and Q pilot filters 132 and 134 are configured as simple first order infinite impulse response (IIR) filters. For each symbol, a fraction of the current filter value is subtracted off and a new input, pilot data $P_I(n)$, $P_Q(n)$ is summed in to produce a new filter output $Pf_I(n)$, $Pf_Q(n)$.

Once per symbol, Dot Product circuit 130 performs the dot product operation defined in Equation (2), taking the $D_I(n)$, $D_Q(n)$ symbol vector and dotting it with the filtered pilot vector $Pf_I(n)$, $Pf_Q(n)$. This results in a scalar value indicative of the magnitude of the data symbol in phase with the pilot, scaled by the strength of the pilot being received.

After truncation and limiting (not shown) used to renormalize the dot product result to the bits of interest, this symbol output is written into a symbol deskew buffer 144. The deskew buffer is a first-in, first-out (FIFO) buffer written with the finger's own particular symbol alignment as provided by symbol enable strobe 158. The deskew buffers in all fingers are read using the same combiner symbol enable strobe (not shown). This compensates for the different offsets the fingers are assigned and allows the symbol combiner 22 to sum the symbol streams from the different fingers together.

The symbol output of the deskew buffer is masked by an AND gate 152 when the finger is in an out of lock state. The lock state 148 is an indicator that the finger is tracking a reliable and reasonably strong path, and masking the finger symbol output when the finger is out of lock produces a higher quality combined symbol stream output from the combiner 22.

The signal processing to determine the lock state begins with the Energy circuit 140 using the I and Q pilot filter outputs to determine $[Pf_I(n)^2 + Pf_Q(n)^2]$, corresponding to the energy in the pilot for the peak being tracked. This energy is then filtered by the lock detect filter 142 to produce a long term average finger energy level. During finger reassignment, the microprocessor 30 can read this finger energy back and compare it to the latest multipath peaks found by searcher 14, reassigning the finger to stronger paths found by the searcher as the multipath environment changes and peaks come and go.

In the preferred embodiment, the lock detect filter 142 is configured as a simple first order IIR filter. For each symbol, a fraction of the finger energy maintained in the filter is subtracted off and the energy result output from energy circuit 140 is summed in to produce a new filtered finger energy output.

The threshold compare block 150 compares the finger energy output from the lock detect filter 142 to an in-lock threshold and an out-of-lock threshold written into the block by the microprocessor 30. If the finger energy is above the in-lock threshold, lock state 148 is forced to the in-lock state. If the energy is below the out-of-lock threshold, the lock state 148 is forced to the out-of-lock state. Otherwise the lock state 148 remains unchanged. This produces a hysteresis effect on lock state 148 in that, once the finger falls out of lock, its energy must rise above in-lock threshold to go back into lock, and once the finger is locked, the energy must fall below the out-of-lock threshold to go out of lock.

Once per symbol, the cross product circuit 146 performs the cross product operation defined in Equation (3), crossing the filtered pilot $Pf_I(n)$, $Pf_Q(n)$ vector with the filtered pilot vector for the previous symbol, $Pf_I(n-1)$, $Pf_Q(n-1)$. This results in a scalar value indicative of the rotation rate of the pilot in QPSK I, Q space, providing a measure of the frequency error between the local oscillator clock and that used to transmit the signal at the base station. After truncation and limiting (not shown) used to renormalize the cross product result to the bits of interest, this frequency error is masked by AND gate 154 when the finger is in an out of lock state, so that the finger only contributes to LO_ADJ signal 36 when it is tracking a reliable and reasonably strong path.

As previously described, a time tracking loop keeps the finger centered on its assigned multipath peak as the peak shifts around while the mobile changes its position relative to objects in its environment, thus causing reflective multipath. On successive symbols, half chip offset pilot symbol integration pairs $P_{IL}(n)$, $P_{QL}(N)$ and $P_{IE}(n)$, $P_{QE}(n)$ are alternately output by late symbol accumulators 118 and 120. Once per symbol, the energy circuit 136 calculates either $[P_{IL}(n)^2 + P_{QL}(n)^2]$ or $[P_{IE}(n)^2 + P_{QE}(n)^2]$, corresponding to the energy in the pilot half a chip offset later or earlier than the peak being tracked. The time track filter 138 calculates the difference between these two energies, $$[P_{IL}(n)^2 + P_{QL}(n)^2] - [P_{IE}(n-1)^2 + P_{QE}(n-1)^2] \quad (4)$$

This difference forms a metric used to drive a second order low pass filter. The gain of both the first and second order contributions are specified by the microprocessor 30. This allows for a wider filter bandwidth during initial acquisition, later changing to a narrower bandwidth that can better reject spurious out-of-band noise once the finger is in lock. The time track filter issues an advance or retard when the final phase accumulation stage overflows or underflows. This feeds back to the finger timing generator 122 that respectively compresses or expands a chip period by a single CHIPX8 clock. This adjusts the finger offset an eighth of a chip in the direction to recenter it onto the peak of the path being tracked.

Figure 1:
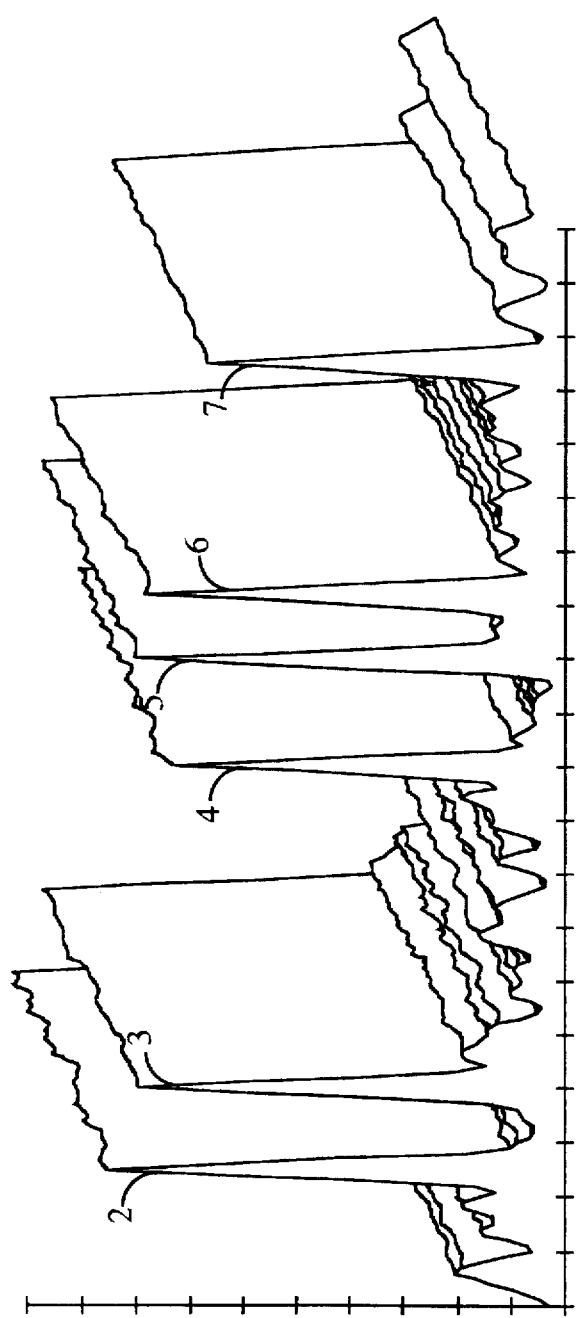
FIG. 1 represents an exemplary severe multipath signal condition.

After the microprocessor 30 specifies a search window starting offset (written to search timing generator 200), and a search window length (written to search control block 206), the searcher 14 steps through the search window, evaluating each offset in the search window in sequence. For each offset, the searcher integrates the pilot over a specified number of chips (written to searcher timing block 200), calculates the resulting pilot energy, and optionally sums several pilot energies over a specified number of intervals (written to search control block 206). The output of the searcher is a trace of the multipath environment in the search window that looks much like FIG. 1. The multipath trace may be returned to the microprocessor directly or, to reduce the amount of data the microprocessor needs to handle, the searcher can filter the results so as to report only a sorted list of the largest peaks found in the search window.

Figure 4:
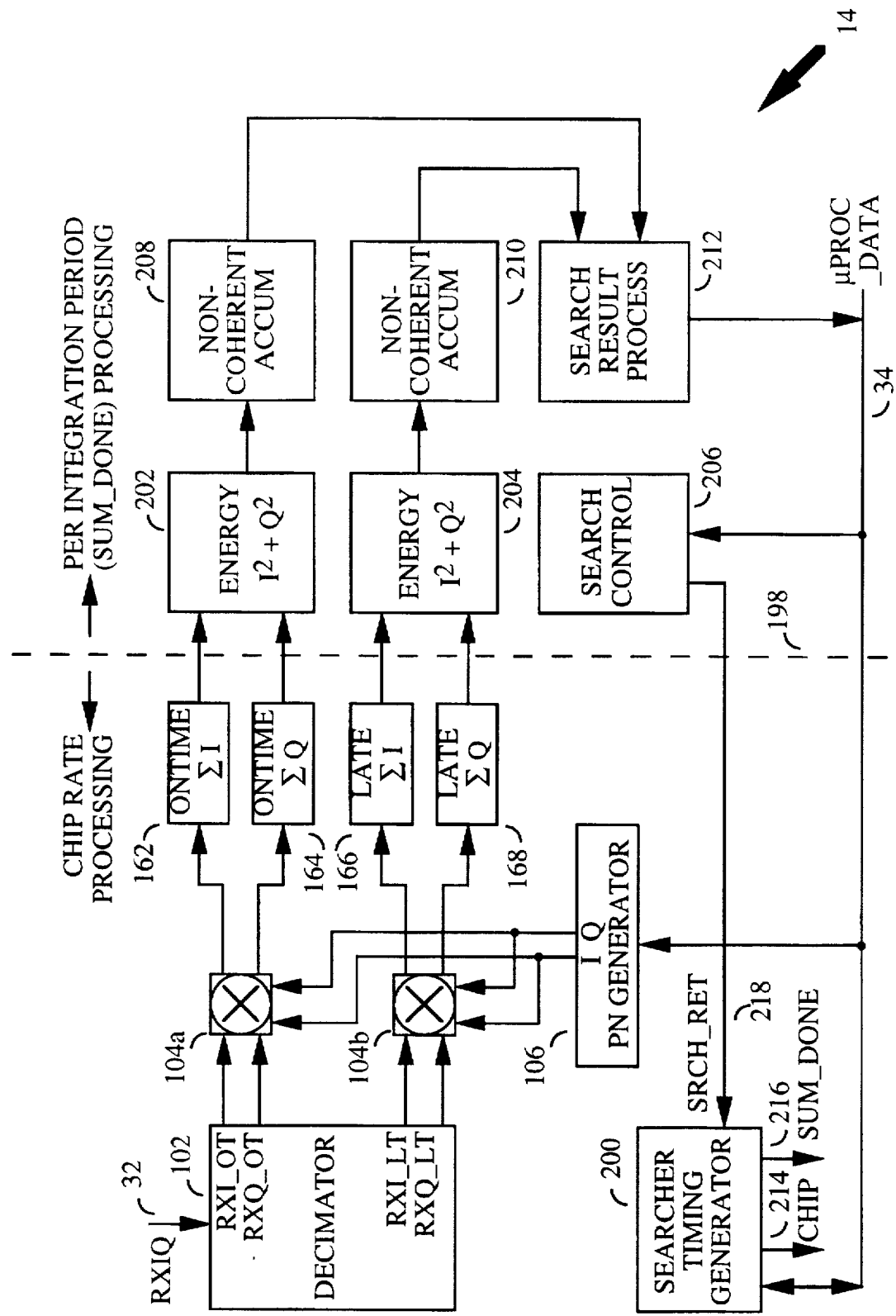
FIG. 4 is a block diagram of the searcher functionality.

Just as the finger processing was divided into chip rate and symbol rate processing, in the preferred embodiment, the searcher is divided into two functional groups as depicted by the searcher functional block diagram of FIG. 4. In a traditional dedicated circuit implementation, each of the elements in FIG. 4 have a correspondence to a physical circuit; in a traditional general purpose DSP implementation, each of these elements have corresponding steps in the signal processing code. All elements operating on the chip level are shown to the left of boundary 198, and all elements operating once per integration interval are shown to the right of boundary 198.

The searcher 14 is provided with I and Q samples 32 that are input to a decimator 102. Unlike the finger 12a–c, which can select one of eight decimations of the input data, the searcher decimator 102 always samples at fixed half chip offsets during a search. The decimator 102 can be fixed because the searcher only evaluates the search window in half chip increments, a coarse sweep that is still detailed enough to ensure that no likely candidate paths are missed. Once a finger is assigned to a path found by a searcher, it will quickly center itself on the path even if the peak falls between two half chip separated search results. The sampling, as well as all other chip rate processing in the searcher, is slaved to the chip enable strobe 214 from searcher timing generator 200.

Each advance or retard generated, either due to a search retard 218 generated by search control block 206 as it sequentially steps the searcher through the search window, or from a slew by microprocessor 30 to begin a new search at a different starting offset, has the effect of slowing down or speeding up the rate at which the chip enable strobe 214 is generated. Searcher timing generator 200 also outputs a sum_done strobe 216 indicating a search integration interval has completed.

The searcher timing generator 200 stores the net effect of all offset changes in an internal searcher position register that can be read by the microprocessor 30. The searcher timing generator 200 also contains an internal position assignment register written to by the microprocessor to slew the searcher to a new offset. When the microprocessor 30 slews the searcher 14, an internal mechanism in the searcher timing generator 200 continues to advance or retard the searcher timing until it determines that the searcher 14 has reached its assigned offset. Once it has reached its assigned offset, the searcher 14 begins the specified search starting with the first offset in the search window.

As with the finger 12a–c, in the searcher 14 the decimated on-time and late I and Q chip samples are provided to QPSK despreaders 104a and 104b respectively. The despreaders 104 also receive from the I Q PN sequence generator 106 the PN sequences identical to those used to spread the data at the base station. The I Q PN sequence generator 106 is slaved to the chip enable output 214 from the searcher timing generator 200, and is thus generating the PN sequences consistent with the current offset being evaluated by the searcher. The searcher is only interested in measuring the pilot strength at each offset and therefore has no need for the Walsh sequence generator found in the finger.

The output of on-time despreader 104a is directly summed by on-time I and Q accumulators 162 and 164 and the output of late despreader 104b is directly summed by late I and Q accumulators 166 and 168, producing a pilot pair $P_I(n)$ and $P_Q(n)$ for symbol, producing a data vector once per integration interval:

$\{P_I(n), P_Q(n), P_{IL}(n), P_{QL}(n)\}$ that is then processed at the integration interval rate by elements drawn to the right of boundary 198 in FIG. 4.

It should be noted that in the preferred embodiment, two offsets, an on time and late pair, are being evaluated simultaneously by the searcher. This parallelism is needed to ensure the searcher produces the multipath trace for typical search windows at a rate faster than the multipath environment changes. The signal processing discussed for the preferred embodiment can also apply without loss of generality to additional despreader accumulator pairs that can be used to obtain additional searcher performance if needed.

After each integration interval, the energy circuit 202 calculates $[P_I(n)^2+P_Q(n)^2]$, corresponding to the on-time pilot energy, and the energy circuit 204 calculates $[P_{IL}(n)^2+P_{QL}(n)^2]$, corresponding to the late pilot energy for the offset currently being evaluated by the searcher. The on-time pilot energy is optionally summed over several integration intervals by non-coherent accumulator 208, and similarly late pilot energy is summed by non-coherent accumulator 210.

After the specified number of integration intervals have elapsed, the results in the non-coherent accumulators 208, 210 are passed to a search result processor 212. Searcher control block 206 then decrements its internal offset count and issues a retard to the searcher timing generator 200. This causes the searcher to step to the next offset in the search window.

As despreading begins, a new PN sequence consistent with the new offset being evaluated is generated by I Q PN generator 106, and on-time and late accumulators 162, 164, 166 and 168 are cleared and begin summing despread pilot chips for the new offset. Once the search control block has sequenced the searcher through the specified number of chips in the search window, it returns the searcher to an idle state until the searcher is again commanded to search another window.

In the above mentioned co-pending U.S. patent application Ser. No. 08/144,902 entitled Demodulation Element Assignment in a System Capable of Receiving Multiple Signals, the preferred embodiment assigns the fingers based on the best results found in a search window. In the preferred embodiment, the four best results are tracked in search result processor 212. (A lesser or greater number of results could be stored in other embodiments.) A result register internal to the result processor 212 stores a sorted list of the largest peaks found and their corresponding offsets. If the latest search results provided by non-coherent accumulators 208 or 210 exceed those stored in the best result list, the control logic in the result processor 212 discards the fourth best result and inserts the new energy and corresponding offset at its appropriate position in the list. There are a great number of methods well known in the art for providing such a sorting function. Any one of them could be used within the scope of this invention.

The search result processor 212 also has a local maximum filter function comparing current energy with energy obtained at the adjacent offset. The local maximum filter, if enabled, prevents the best result list from being updated even though a result would otherwise qualify for inclusion, unless the result represents a local multipath peak. In this way, the local maximum filter prevents strong, broad "smeared" multipath from filling multiple entries in the best result list, leaving no room for weaker but distinct multipath that can make better candidates for demodulation.

The implementation of the local maximum filter is straightforward. The current search result is compared to the preceding offset's result, the comparison result indicating the slope of the peak being traced. A slope transition from positive to negative indicates a local maximum and enables the best result list to be updated. The slope latch can be appropriately initialized and followed through so boundary edge offsets can be considered for inclusion as well.

At the end of a search, the best result list is provided to the microprocessor. Having the searcher filter the results so that only the largest peaks need to be looked at by the microprocessor 30 significantly reduces the amount of processing the microprocessor 30 spends on its searcher task.

Figure 5:
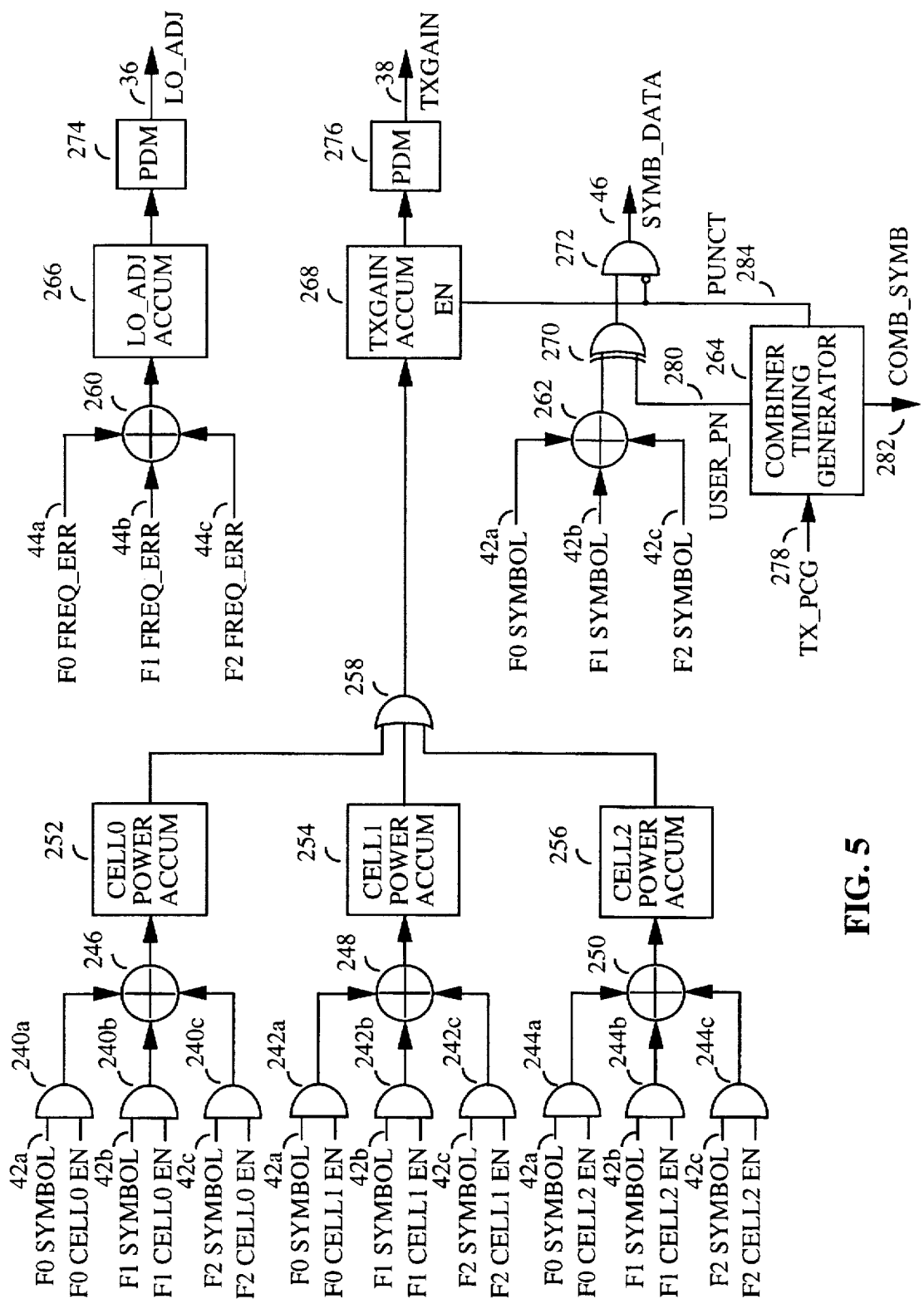
FIG. 5 is a block diagram of the combiner blocks functionality.

FIG. 5 is a functional overview of the processing for the symbol combiner 22, the power control symbol combiner 24 and the frequency error combiner 26 in the mobile demodulator of FIG. 2. Once per symbol, the symbol combiner takes the deskewed symbol streams 42a–c from the three fingers, sums them via adder 262 and, after truncation and limiting (not shown), descrambles the combined soft decision symbol via XOR gate 270 using a user-specific long code 280 time aligned to a counterpart in the cell. The user long code 280 is unique to each user and configured with parameters that have not been broadcast over the air during call setup, thus providing some measure of privacy. The user PN generator is embedded in and time aligned with a combiner timing generator 264. The combiner timing generator 264 outputs a combiner symbol strobe 282, independent of the finger symbol strobes 158a–c, which has been previously mentioned in its role enabling simultaneous reads from the symbol deskew buffers 144 in the fingers 12a–c.

Combiner timing generator 264 has an input TX_PCG signal 278 coming from the modulator section of the modem (not shown), indicating that the mobile unit transmitted on the reverse link during the prior power control group. In the preferred embodiment, the power control group is a 1.25 msec interval over which the mobile unit may gate its transmission on the reverse link. If the mobile transmitted, TX_PCG 278 tells the combiner to listen for a power control decision on the closed loop power control decision sub-channel on the forward link.

Bits sampled from the user PN sequence 280 determine which of the forward link traffic symbols within a power control group are punctured to provide the power control decision bits. In the preferred embodiment, depending on the application the power control decision may puncture one or two symbols. During the punctured symbol, the combiner timing generator 264 asserts the PUNCT signal 284. This masks the symbol data so that an erasure is placed in the symbol data stream 46 provided to the deinterleaver and decoder. Given the powerful forward error correction codes used in the preferred embodiment, the decoder 28 can reconstruct the punctured symbols.

The power combiner 24 uses the same three deskewed finger symbol streams used by the symbol combiner 22. The power control symbol combiner 24 is actually three separate adder accumulator pairs allowing the mobile to monitor power decisions from three different cells. Normally only one of these adder-accumulator pairs is active, but in two way or three way soft hand-off, the mobile can take power decisions from two or three cells at the same time.

Cell 0 uses adder 246 and accumulator 252; Cell 1 uses adder 248 and accumulator 254; Cell 2 uses adder 250 and accumulator 256. Once per symbol, adders 246, 248 and 250 sum the symbol streams 42a–c from the three fingers 12a–c. Accumulators 252, 254 and 256 sum the resulting combined symbols over two successive symbols if two-symbol puncturing is used. During soft hand-off, the fingers 12a–c can be reassigned freely between cells as the multipath environment for each cell changes.

To provide maximum flexibility, AND gates 240a–c, 242a–c, and 244a–c provide the microprocessor 30 a means to switch fingers from one cell to another. For example, when not in soft hand-off, only the cell 0 adder-accumulator pair 246 252 is used. All three AND gates 240a–c are enabled, while the AND gates 242a–c and 244a–c for cell 1 and 2 respectively are disabled, masking the finger contributions to adder-accumulator pairs 248 254 and 250 256, effectively shutting them down.

In a three way soft hand-off, one finger is assigned to each cell and one each of AND gates 240a–c 242a–c and 244a–c are enabled with the other two AND gates from each grouping disabled, so that all three adder-accumulator pairs are active. The sign bit in accumulators 252, 254, 256 form a hard "up=0" or "down=1" decision.

In a soft hand-off, if any one cell is requesting the mobile to turn down its transmit power, this indicates that the mobile is coming through loud and clear at that cell and the other cells decisions should be ignored. This logic is reflected in the "or-of-the-downs" OR gate 258 which combines the power decisions from the active cells. The output of OR gate 258, representing the final combined decision, is summed in TXGAIN accumulator 268.

TXGAIN accumulator is enabled by the PUNCT signal 284, ensuring that its transmit gain output is adjusted only in response to the power decision symbols. The TXGAIN value is converted to an analog voltage level by externally R-C filtering the TXGAIN output of pulse density modulator (PDM) 276, which outputs a pulse train whose density over a set time interval is proportional to the input value provided by TXGAIN ACCUM 268.

Once per symbol, the frequency error combiner 26 takes the frequency error streams 44a–c from the three fingers, sums them via adder 260, and after truncation and limiting (not shown), sums the combined frequency error into LO_ADJ accumulator 266 to provide a local oscillator adjustment reference. The LO_ADJ value is converted to an analog voltage level by externally R-C filtering the LO_ADJ output 36 of PDM 274. The PDM 274 outputs a pulse train whose density over a set time interval is proportional to the input value provided by LO_ADJ ACCUM 266.

In a traditional dedicated circuit implementation, each multiplier, accumulator or comparator described in FIGS. 3, 4 and 5 is implemented separately as a discrete circuit, with each element having a direct correspondence to some circuit area on an integrated circuit (IC) die. Of particular concern are the four multiplier accumulators used to perform on-time pilot filter energy, early or late pilot filter energy, the cross product operation, and the dot product operation, replicated for each finger.

Figure 6:
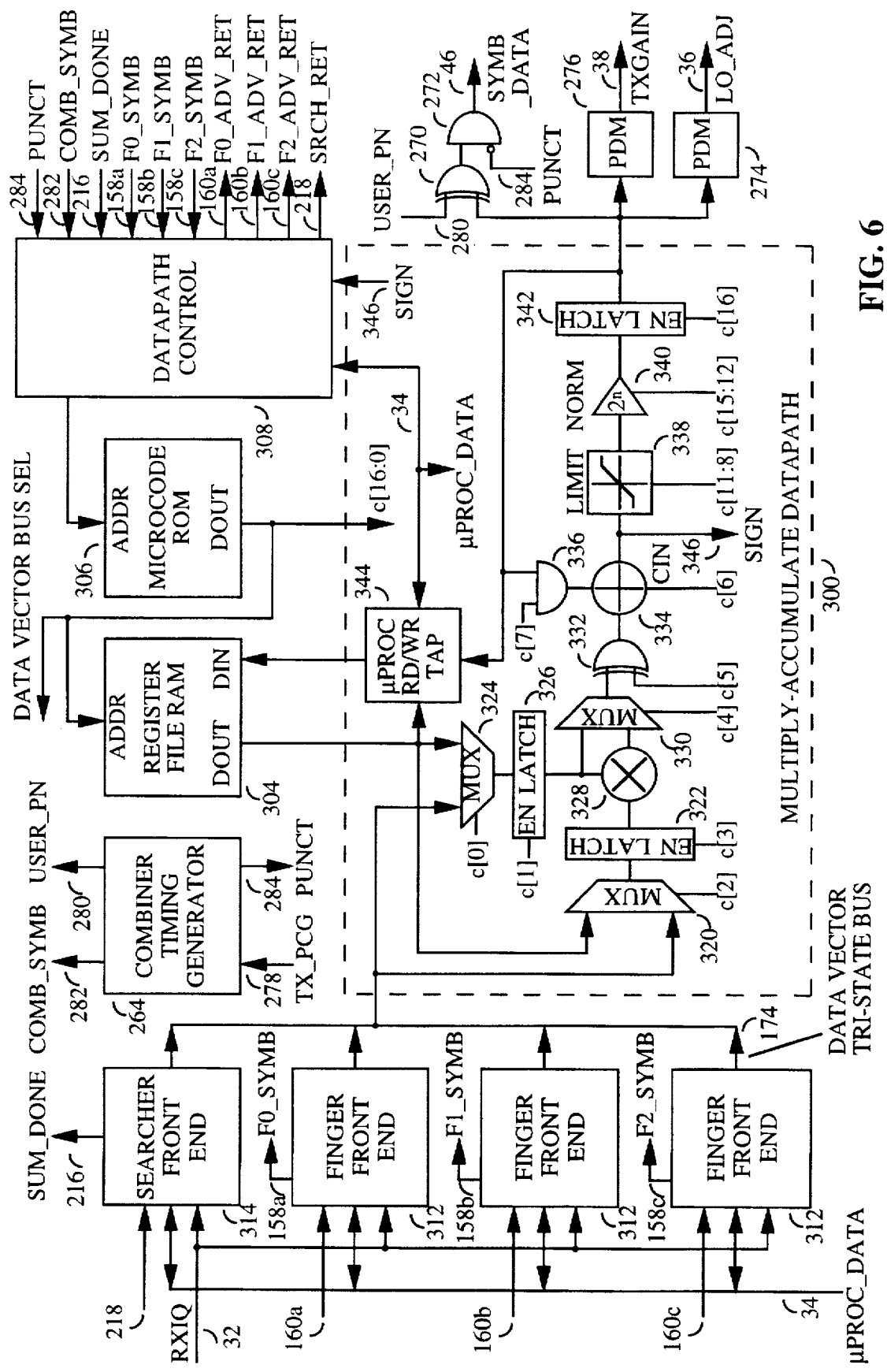
FIG. 6 is a block diagram of the shared datapath architecture mobile demodulator according to the invention.

These structures take a sizable amount of die area to implement, and the inventor recognized with a full symbol to complete the processing, the functionality could be more efficiently implemented using a shared datapath. The resulting hybrid architecture, containing elements of both the dedicated circuit and general DSP approaches, is shown in FIG. 6. All of the finger chip rate circuits shown to the left of line 98 in FIG. 3 and the searcher chip rate circuits shown to the left of line 198 in FIG. 4 are preserved in residual dedicated circuits depicted in FIG. 6 as finger front ends 312 and searcher front end 314 respectively. All of the finger symbol rate processing to the right of line 98 in FIG. 3, all of the searcher per integration interval processing to the right of line 198 in FIG. 4, and the combiner functions of FIG. 5 have been integrated into a shared multiply-accumulator datapath 300.

Once per symbol, the finger front ends 312 produce a data vector consisting of the I and Q symbol integration for the traffic channel symbol data, the on-time pilot, and the early or late pilot. Once per integration interval, the searcher front end 314 produces a data vector consisting of the I and Q symbol integration results for the on-time and late pilot. Components of the data vectors are accessed by the shared datapath through a tri-state bus 174 shared in common by the finger front ends and the searcher front end.

Once per symbol, combiner timing generator 264 outputs a combiner symbol enable 282, finger front ends output their individual symbol enables 158a–c, and once per searcher integration interval, searcher outputs a sum_done signal 216. Datapath control circuit 308 uses these strobes to arbitrate the use of datapath 300 between the finger front ends 312, the searcher front end 314 and combining functions on a first-come, first-serve basis. Once queued, the controller 308 sequences the datapath 300 through a section of microcoded instructions stored in the microcode ROM 306. The microcode configures the internal elements of datapath 300 to allow it to perform all of the accumulations, multiplication, and comparisons needed for the signal processing of the block being serviced. The controller reads and writes from a random access memory (RAM) 304 which acts as a register file storing all demodulator state information preserved across symbol boundaries. These include such items as the deskew memory and various filter values for each finger 12a–c, and sorted list of largest peaks found for the searcher 14.

Figure 7:
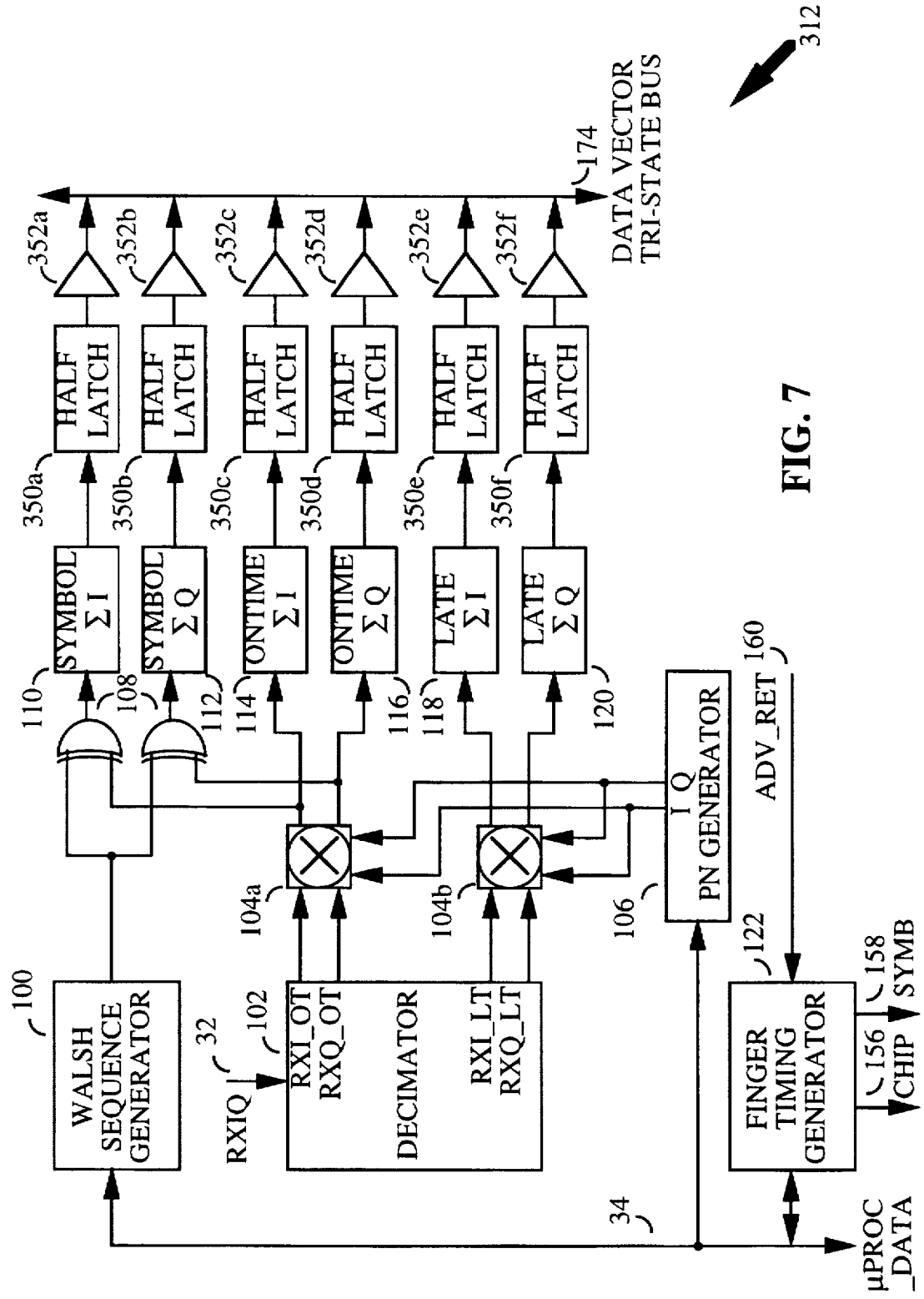
FIG. 7 is a block diagram of the finger front end.

FIG. 7 is a block diagram of a finger front end 312. It performs the identical function of the chip rate processing detailed earlier for the finger of FIG. 3 up to chip accumulators 110, 112, 114, 116, 118, 120. On the finger symbol enable strobe 158, the data vector output of these accumulators is latched by half latches 350a–f, buffering the data vector so that the finger chip accumulators may begin summing the data vector for the next symbol while the values latched in half latches 350a–f await their turn to be processed by shared datapath 300. Half latches 350a–f are tri-state buffered 352a–f to allow them to be output on a common bus shared between all finger front ends and searcher front end. The tri-state bus 174 is a distributed multiplexer; datapath control 308 selects one of the tri-state drivers 352a–f in a finger front end or the searcher front end to drive out onto the bus. The tri-state bus 174 provides the datapath access to all of the various data vector components with minimal routing overhead. The finger front end timing generator 122 accepts an external advance or retard 160 generated by datapath control 308 as it updates the values of that finger's time tracking filter.

Figure 8:
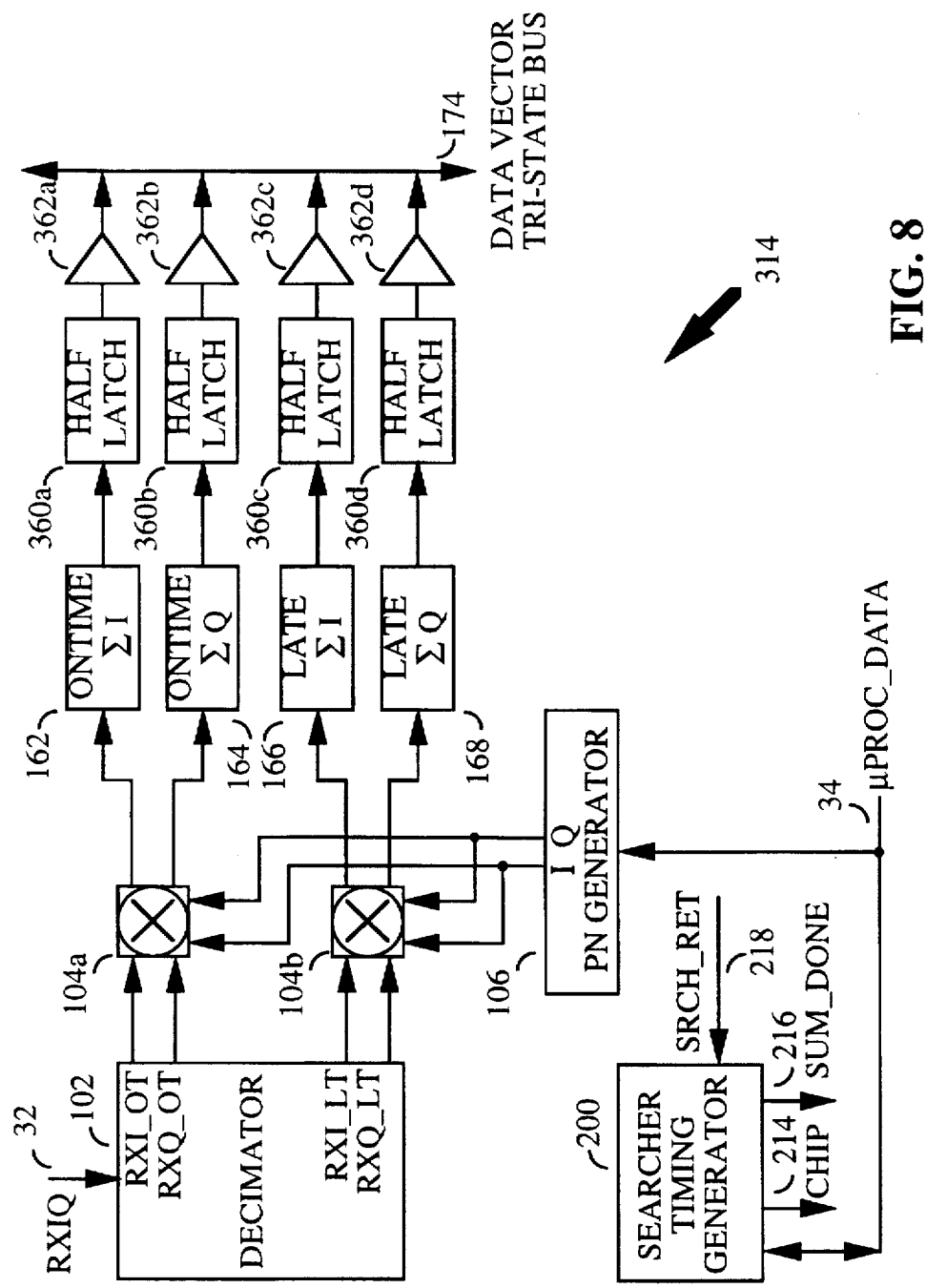
FIG. 8 is a block diagram of the searcher front end.

FIG. 8 is a block diagram of the searcher front end 314. It performs the identical function of the chip rate processing detailed earlier for the searcher of FIG. 4 up to chip accumulators 162, 164, 166, 168. On the searcher sum_done boundary 216, the data vector output of these accumulators is latched by half latches 360a–d, buffering the data vector so that the searcher chip accumulators may begin summing the data vector for the next symbol while the values latched in half latches 360a–d await their turn to be processed by shared datapath 300. Half latches 360a–d are tri-state buffered 362a–d to allow them to be output on a common bus 174 shared with the finger front ends. Datapath control 308 selects one of the tri-state drivers 362a–d to drive out onto the bus while the datapath is servicing the searcher. The searcher front end timing generator 200 accepts an external searcher retard generated by datapath control 308 as it finishes processing one offset and moves to consider the next offset in the search window.

Returning to FIG. 6, datapath 300 includes two operand input latches 322, 326. These operand latches can contain values from either the tri-state data vector bus 174 or from register file RAM 304, independently selected via multiplexer (MUX) 320 and MUX 324. For example, when squaring $P_{IL}(n)$ for the half chip late pilot energy calculation used in time tracking; in this case MUX's 320 and 324 both select the input from the data vector input bus. When performing the dot product, filtered pilot $Pf_i(n)$ is read from the register file RAM which is selected by MUX 324 and captured by latch 326, while $D_i(n)$ for the finger being serviced is driven onto the data vector input bus which is selected by MUX 320 and captured by latch 322. The two operand latches are multiplied by multiplier 328.

Multiplier 328 is a full parallel combinational multiplier yielding the product of the two operands within a single clock cycle. Either the multiplier output or the operand stored in latch 326 is selected via MUX 330 to be summed by adder 334 with accumulator feedback latch 342.

All arithmetic operations in the datapath are performed using 2's complement representation of values, so by performing a 1's complement inversion using XOR gate 332 and fixing the carry in to the LSB of adder to 1, the output of MUX 330 may be conditionally subtracted instead of added. AND gate 336 can conditionally mask the feedback of accumulator latch 342 summing into adder 334, so the output of MUX 330 may be loaded into the accumulator latch 342 instead of being summed with its prior contents.

The output of the adder feeds a programmable limit stage 338 that, together with a programmable normalization stage 340, selects only the adder output bits of interest for the operation being performed. By renormalizing the results after each operation, truncating the LSBs that are well below the system noise floor, and saturating any MSB's that rarely if ever get set, all values operated on can be maintained in at most a double precision word without ever encountering bit overflow.

The data vector provided on tri-state bus 174 is a single precision word, 10 bits wide in the preferred embodiment. Typically the finger symbol and frequency error stored in register file RAM 304 are single precision words, while filter values are stored as double precision words, 20 bits wide in the preferred embodiment. The register file RAM 304 consists of two banks that can be accessed independently to access a single precision word or together to access a double precision word.

A storage map of register file 304 that, in the preferred embodiment, is comprised of two RAM banks of 64 10-bit words, is shown in FIG. 9. Storage in the register file is divided into finger pages, a searcher page and a combiner page. The organization of the fields within a finger page is the same for each finger, so that the index of the finger front end being serviced forms the page select, and the finger state values accessed from register file 304 is specified as an offset into the selected page. For each finger 12a–c, the symbol deskew buffer memory, the I and Q pilot filters values and their delayed version for the cross product, the time track filter values, and the lock energy filter value are all stored in register file.

The register file contains microprocessor write registers, namely the in-lock and out-of-lock thresholds, the initial finger energy and frequency accumulator term used in the second order time tracking loop, taken after the finger completes a slew. The register file also contains microprocessor read registers, namely the finger energy and frequency accumulator term used in the second order time tracking loop. These values are stored more efficiently in RAM than in discretely implemented read and write latches; a microprocessor read/write tap 344 provides a port through which the microprocessor can read or write these values, temporarily halting the sequencing of the datapath while an access is made. The microprocessor accesses these values infrequently enough so that any resulting delay in datapath sequencing is insignificant.

For the searcher 14, the register file stores the intermediate values of the on-time and late non-coherent accumulators, as well as the prior energy value used in local maxima detection, and the sorted list of the four strongest peaks found by the searcher and their corresponding offset. For the combiner, the register file stores the state of cell accumulators 252, 254, and 256 when summing two consecutive punctured symbols, as well as the states of the TXGAIN accumulator 268 and the LO_ADJ accumulator 266. The initial value of TXGAIN and LO_ADJ accumulators 268, 266 can be specified by microprocessor 30, and their current value read back by microprocessor 30 using the read/write tap 344.

Returning to FIG. 6, the limited, normalized adder output is captured by accumulator latch 342. Accumulator latch 342 output feeds back to adder 336 for further summing, and its contents can be written back into register file RAM 304. The output of Latch 342 is captured by TXGAIN PDM 274 and LO_ADJ PDM 276 at the appropriate time as updated TXGAIN or LO_ADJ accumulator values respectively are written back into register file RAM 304. While servicing the combiner functions, the datapath produces at one point the combined symbol at the output of accumulator latch 342. The combined symbol is then scrambled by XOR gate 270 and erased by AND gate 272 by user PN sequence 280 and PUNCT signal 284 outputs of combiner timing generator 264 respectively, as described previously for these same circuits shown in FIG. 5.

Due to ease of implementation, in the preferred embodiment, certain states affecting the sequencing of the datapath, such as the finger lock states, the slope latch for the local maxima filter, the read and write pointers for the finger deskew buffer, the non-coherent accumulation and current search offset count are realized by discrete latches and accompanying control logic internal to datapath control circuit 308, instead of through datapath sequencing and additional storage allocations in register file 304. By tracking the read and write deskew buffer pointers, the largest time intervals handled by the combiner timing generator 264 and the finger timing generator 122 are their respective symbol interval strobes 282 and 158.

The datapath control 308 uses the sign bit output 346 from adder 334 as a flag to control the datapath sequencing for the in-lock threshold, the out-of-lock threshold, the local maximum filter, and during the sorting of the best searcher result list. If sign bit 346 overflows while computing the new time track filter output, this signifies the finger to advance or retard by a CHIPX8. When this happens, the advance or retard command 160a–c is fed back from datapath control 308 to the finger front end 312 being serviced by the datapath. Through microprocessor databus 34, the microprocessor 30 specifies to the datapath controller 308 the number of integrations to perform for each offset and the number of offsets in the search window. The microprocessor also specifies to the datapath control the per cell finger enables for power combining, the finger time tracking loop gains, and can also directly write the lock state of the finger, overriding the value determined by the lock threshold comparison.

As mentioned earlier, the finger front ends, combiner functions, or searcher front end are serviced on a first-comefirst-serve basis as their respective symbol enable strobes 158a–c, 282 or sum_done strobe 216 are asserted. Datapath control 308 places the requesting elements in a queue to be processed as soon as the datapath 300 has finished its servicing of earlier requesting elements. If two or more elements request servicing at exactly the same time, datapath control 308 arbitrarily assigns one of the contending elements to be first in the queue and the other lines up behind it. Since the finger front end and searcher front end outputs are buffered, the datapath has a full symbol to service them until the next symbol result overwrites the data vector in the buffer. So long as the datapath has extra clock cycles available per symbol period, it can always ensure that each finger 12a–c can be serviced before the next symbol boundary occurs under any worst-case queuing scenario.

During an advance, the finger time tracking loop shaves an inconsequential single clock off the interval between successive symbol strobes 158. Of more concern is the case when multiple fingers 12a–c are being slewed in an advancing direction. In this scenario, the fingers 12a–c are advancing on a chip per chip basis, so that the interval between successive symbol strobes 158 is halved. Rather than having to design the datapath sequencing so that it has enough headroom to handle a worst-case queue pattern using a 256 clock interval, the finger timing generators 122 simply suppress their symbol enable strobe output 158a–c during an advance, reenabling them once the fingers complete a slew and arrive at their assigned offset.

Once queued, the controller sequences the datapath through a fixed processing sequence, configuring it to perform all of the accumulations, multiplication, and comparisons associated with the signal processing of the block being serviced. The type of element being serviced forms a page select into microcode ROM 306, and the clock count into the sequencing is used as an offset into the selected page to form the microcode ROM address. The microcode ROM output specifies the component driven onto data vector tri-state bus 174, any accesses to or from register file RAM 304, and a control word, labeled c[16:0], configuring the internal elements of shared datapath 300. Signals c[0], c[2], c[4] form mux select input for MUX's 324, 320, 330 respectively; signals c[1], c[3], c[16] are enables for latches 326, 322, 342 respectively; signals c[5], c[6], c[7] control the conditional subtract and load functions for adder 334, and fields c[11:8] and c[15:12] fully specify the limit and normalization bit positions for the output of adder 334.

The sequence of operations performed by the datapath on successive clock cycles while servicing a finger front end 312 is shown in FIG. 10. It closely follows the symbol rate processing for the finger discussed in relation to FIG. 3. For each cycle, the table in FIG. 10 lists the component, if any, driven onto tri-state data vector bus 174, the accesses, if any, to or from the register file RAM 304, the c[16:0] datapath control word, and a brief comment useful in referring back to description of the symbol rate signal processing for the finger in FIG. 3.

First, the pilot filters are updated by subtracting off a fraction of their current level and summing in the on-time I and Q pilot accumulator outputs from the selected finger front end during clock cycles 0–6. During clock cycles 7–9, the dot product is calculated using the filtered pilots and the symbol accumulation outputs of the selected finger front end. During clock cycles 10–13, the cross product is calculated using the filtered pilots and the previous symbol's filtered pilot values stored in register file 304. During clocks 14–16 the pilot energy is calculated. This energy is written to a temporary scratch location in register file 304 while the lock detect filter is first updated by subtracting off a fraction of its current level during clock cycles 17–18.

The pilot energy for the current symbol is then read back out and summed to yield a new lock detect filter value which is written back to register file 304 during clock cycles 19–21. A new lock state is also determined by comparison with the in-lock and out-of-lock thresholds during clock cycles 20–21. During clocks 22–24 the late pilot energy is calculated, subtracted with the early pilot energy obtained on the previous symbol and read back from register file RAM 304 to generate a late–early energy delta metric to drive the second order time tracking loop.

The time track metric is written into the register file 304 and read immediately back again to position it as an input to the datapath. It is scaled by microprocessor specified gain constant K1 as it is loaded into the accumulator output latch 342 during clock cycle 27. This scaled value is then added to the time tracking frequency accumulator component of the second order filter. The updated time tracking frequency accumulator is written back into the register file 304 and read immediately back again to position it as an input to the datapath, where it is summed with the time tracking metric scaled by microprocessor specified gain constant K2 during clock cycle 32. This value is summed with the time tracking phase accumulator component of the second order filter, and the new phase accumulator value is written back to register file 304 on clock cycle 34. Thus the datapath requires a total of 35 clock cycles to process a finger for each symbol.

The sequence of operations performed by the datapath on successive clock cycles while servicing the searcher front end 314 is shown in FIG. 11. It closely follows the per integration interval processing for the searcher discussed in relation to FIG. 4. During clock cycles 0–2, the pilot energy for the late pilot integration is calculated. This energy is summed with an intermediate non-coherent accumulator value on clock cycle 3, and the new sum over the number of elapsed integration intervals is written back into register file 304 on clock cycle 4. These same operations for the on-time pilot integration occur during clock cycles 4–8. If the searcher 14 still has further integrations to perform at the same offset, the datapath is then finished servicing the searcher, as indicated by the solid line drawn after clock cycle 8 in FIG. 11.

If, instead, this is the final integration interval for the current offset, processing continues. The local maxima filter processing occurs during clock cycles 9–12. The datapath 300 determines the slope of the multipath trace between the on-time and late offset results, and between the late offset result and the prior offset's on-time result which has been stored in register file 304. If the slope latch transitions from "1" to "0", a local maxima has been detected. The datapath 300 can then consider the peak for inclusion in the sorted list of the largest peaks found in the search up to that point.

Starting with peak 0, the strongest peak, on clock cycle 13, and continuing through to peak 3 on clock cycle 23, the energy for the current offset being processed is compared with the stored peaks. If the input energy is greater than the stored energy being compared against, the input energy overwrites the stored energy, that then simultaneously replaces the input energy in accumulator latch 342. By stepping from larger to smaller peaks, once the input energy exceeds a stored peak, all of the lesser peaks are automatically "demoted" a ranking as a matter of course as the peak comparison progresses. This is but one of a number of methods well known in the art for providing such a sorting function. Any one of them could be used within the scope of this invention. The minimum searcher integration interval in the preferred embodiment is 32 chips, and with a single integration interval per offset, worst case, the datapath 300 requires a total of 24 clock cycles for every 32 chip integration interval to support the searcher.

The sequence of operations performed by the datapath on successive clock cycles, while servicing the combiner functions, is shown in FIG. 12. It closely follows the symbol rate processing for the combiner functions discussed in relation to FIG. 5. One deskewed finger symbol per clock cycle is read from register file 304, resulting in a final combined, limited and truncated soft decision symbol on clock cycle 3. During clock cycles 4–8, 9–13, 14–17 similar per finger summations take place on punctured symbols for cell 0, cell 1, and cell 2 power control decisions respectively. If two symbol puncturing is used, the combined punctured symbol may be summed with the prior combined symbol for the cell being processed, stored in register file 304. The "or-of-the-downs" OR gate 258 is a discrete gate in datapath control 308 using the adder sign bit output 346 as a hard up/down decision for each cell as they are sequenced through. During clock cycles 19–20, a +1 or –1 based on the combined power decision is added to the TXGAIN value read from register file 304. The new TXGAIN value is captured by PDM 276 as it is written back into register file 304. During clock cycles 22–24, one finger frequency error per clock cycle is read from register file 304 and summed to produce a new frequency error adjustment, which is added to the LO_ADJ value read from register file 304. The new LO_ADJ value is captured by PDM 274 as it is written back into register file 304. Thus the datapath requires a total of 28 clock cycles to process a finger for each symbol.

The architecture of the present invention has several advantages. For example, because the complex processing blocks are shared across a set of finger front end blocks, the ability to demodulate an additional signal path can be added by simply adding a new finger front end block. The finger front end block does not require a significant die area, and therefore, the cost of extending demodulation capability in this fashion is fairly low. With 512 CHIPX8 clocks per symbol, the datapath has plenty of "headroom", or idle cycles in excess of what it needs to perform its assigned signal processing tasks.

As calculated in the presentation of FIGS. 10, 11, and 12, during a 512 CHIPX8 symbol interval, the preferred embodiment using three finger front ends and a minimum searcher integration interval of 32 chips the datapath will be processing the fingers for 105 clock cycles, the searcher for 48 clock cycles and the combiner for 28 clock cycles, using a total of 181 of the 512 available clock cycles, corresponding to a 35% utilization factor. Another way of stating this is the datapath runs at 3.5 MIPS. This demonstrates the significance of the off-loading the simple chip rate functions to the dedicated searcher and finger front ends; which drops the signal processing requirement from 75 MIPS to 3.5 MIPS. This translates directly to power savings, and the power consumed by the dedicated front ends adds back only a fraction of this amount. For significant extensions in the amount or type of finger and searcher processing, or to support higher data rate services with their correspondingly shorter symbol periods, this headroom can be increased by simply increasing the frequency at which the shared datapath is clocked.

The demodulator architecture embodied in this invention is a hybrid of traditional dedicated circuit and general purpose DSP approaches. In comparison with the traditional dedicated circuit approach, the shared datapath consumes less power and is considerably smaller than the discrete symbol rate circuits presented in FIGS. 3, 4, and 5. The shared datapath is compact and tailored to the modest needs of the processing tasks at hand, using 10 bit single precision and 20 bit double precision arithmetic. The hybrid approach maintains the flexibility of coding algorithms in firmware instead of dedicated circuitry. The timeline sequencing of FIGS. 10, 11, and 12 form a basis for a small microcode kernel; taken together the finger, searcher and combiner functions are implementable in under 100 lines of microcode.

The previous description of the preferred embodiment is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. An integrated circuit for demodulating multiple instances of a spread spectrum signal over which symbols are transmitted at a symbol rate, wherein said symbols are divided into chips at a chip rate that is higher than the symbol rate comprising:

a plurality of demod front ends for demodulating the multiple instances of the spread spectrum signal at the chip rate; and a symbol processing system for processing each demodulated instance of the spread spectrum signal at said symbol rate in a time-divided manner.

2. The integrated circuit as set forth in claim 1 wherein said symbol processing system is a digital signal processor.

3. The integrated circuit as set forth in claim 1 wherein, said demod front ends are further for generating a corresponding set of symbol estimates by accumulating a set of chips associated with a symbol duration, and said symbol processing system is further for phase rotating said set of symbol estimates, and combining said set of symbol estimates after phase rotation, wherein said symbol processing system operates on said set of symbol estimates in a time-divided manner.

4. The integrated circuit as set forth in claim 1 wherein a demod front end from said plurality of demod front ends is comprised of:

Walsh code demodulator for demodulating an instance of said spread spectrum signal with a Walsh code; and spreading code demodulator for demodulating said Walsh-code-demodulated instance of said spread spectrum signal with a spreading code.

5. The integrated circuit of claim 1 wherein, said plurality of demod front ends contains more demod front ends than said symbol processing system contains symbol processing systems.

6. A spread spectrum demodulation apparatus for use in a multiple access communication system, the apparatus comprising:

a plurality of finger front ends, each front end receiving spread signals and performing chip rate signal processing associated with the spread spectrum demodulation apparatus;

a buffer, coupled to the plurality of finger front ends, for buffering per symbol accumulated data vectors;

a storage device for maintaining state information associated with symbol rate signal processing of the spread spectrum demodulation apparatus;

an arithmetic datapath, coupled to the storage device and the buffer, for performing symbol rate multiply and accumulate functions associated with signal processing of the spread spectrum demodulation apparatus, the arithmetic datapath having a symbol output; and a datapath control circuit, coupled to the arithmetic datapath, for arbitrating the use of the arithmetic datapath among the plurality of finger front ends.

7. The spread spectrum demodulation apparatus of claim 6 wherein the arithmetic datapath comprises:

a first multiplexer having a first input coupled to the plurality of finger front ends and a second input coupled to the storage device, the first multiplexer selecting a first signal from a finger front end of the plurality of finger front ends or the storage device, the first multiplexer providing the first selected signal at an output;

a second multiplexer having a first input coupled to the plurality of finger front ends and a second input coupled to the storage device, the second multiplexer selecting a second signal from a finger front end of the plurality of finger front ends or the storage device, the second multiplexer providing the second selected signal at an output;

a multiplier having a first input coupled to the first multiplexer and a second input coupled to the second multiplexer, the multiplier providing a product signal at an output;

a third multiplexer having a first input coupled to the multiplier output and a second input coupled to the second multiplexer output, the third multiplexer providing either the second selected signal or the product signal at an output;

an adder/subtractor having a first input coupled to the third multiplexer output and a second input coupled to an arithmetic datapath output signal, the adder/subtractor providing a sum signal at an output;

a limiter/normalizer circuit, coupled to the adder/subtractor output, for selectively limiting the sum signal to a predetermined range, the limiter/normalizer circuit providing a normalized sum signal; and a latch, coupled to the limiter/normalizer circuit, for storing the normalized sum signal thus providing the arithmetic datapath output signal.

8. The spread spectrum demodulation apparatus of claim 6 and further including:

a searcher front end, coupled among the received spread signals and the arithmetic datapath, for calculating signal energy of the plurality of received spread signals; and a symbol combiner, coupled to the arithmetic datapath, for combining the symbol output into a demodulated symbol stream.

9. The spread spectrum demodulation apparatus of claim 8 wherein the datapath control circuit further arbitrates the use of the arithmetic data path among the finger front ends, the searcher front end, and the symbol combiner.

10. The spread spectrum demodulation apparatus of claim 8 wherein the searcher front end comprises:

a pseudonoise sequence generator for generating an I sequence and a Q sequence;

a decimator, coupled to the received spread signals, for generating an I on-time signal, a Q on-time signal, an I late signal, and a Q late signal by selectively sampling the received spread signals;

a first despreader coupled to the I and Q sequences from the pseudonoise sequence generator and the I and Q on-time signals, the first despreader generating a first despread I signal and a first despread Q signal;

a second despreader coupled to the I and Q sequences from the pseudonoise signal generator and the I and Q late signals, the second despreader generating a second despread I signal and a second despread Q signal;

a plurality of accumulators, a first accumulator coupled to the first despread I signal, a second accumulator coupled to the first despread Q signal, a third accumulator coupled to the second despread I signal, and a fourth accumulator coupled to the second despread Q signal, the plurality of accumulators summing their respective I or Q signals;

a plurality of latches, each latch coupled to an accumulator of the plurality of accumulators; and a timing generator for controlling the first and second despreaders, the pseudonoise sequence generator, and the plurality of accumulators.

11. The spread spectrum demodulation apparatus of claim 6 wherein each finger front end of the plurality of finger front ends comprises:

a pseudonoise sequence generator for generating an I sequence and a Q sequence;

a decimator, coupled to the received spread signals, for generating an I on-time signal, a Q on-time signal, an I late signal, and a Q late signal by selectively sampling the received spread signals;

a first despreader coupled to the I and Q sequences from the pseudonoise sequence generator and the I and Q on-time signals, the first despreader generating a first despread I signal and a first despread Q signal;

a second despreader coupled to the I and Q sequences from the pseudonoise signal generator and the I and Q late signals, the second despreader generating a second despread I signal and a second despread Q signal;

a Walsh sequence generator for generating a Walsh chip sequence;

an uncover circuit, coupled to the Walsh chip sequence generator, for reversing orthogonal covering of the first despread I and Q signals in response to the Walsh chip sequence;

a plurality of accumulators, a first accumulator coupled to the first despread I signal, a second accumulator coupled to the first despread Q signal, a third accumulator coupled to the second despread I signal, a fourth accumulator coupled to the second despread Q signal, and a fifth and sixth accumulator coupled to the uncover circuit, the plurality of accumulators summing their respective I or Q signals;

a plurality of latches, each latch coupled to an accumulator of the plurality of accumulators; and a timing generator for controlling the first and second despreaders, the pseudonoise sequence generator, and the plurality of accumulators.

12. A method for spread spectrum demodulation in a multiple access communication system, the method comprising the steps of:

receiving spread signals by a plurality of finger front ends;

performing chip rate signal processing, associated with a spread spectrum demodulator, on the received spread signals;

buffering per symbol accumulated data vectors of the received spread signals;

saving state information, in a storage device, associated with symbol rate signal processing of the spread spectrum demodulator;

performing symbol rate multiplying and accumulating functions associated with signal processing of the finger front ends; and arbitrating and sequencing the symbol rate multiplying and accumulating among the plurality of finger front ends.

13. The method of claim 12 wherein the step of arbitrating and sequencing further includes:

arbitrating among the plurality of finger front ends, a combiner, and a searcher front end;

performing searcher integration interval multiplying and accumulating functions associated with the signal processing of the searcher front end; and performing the symbol rate accumulating functions associated with signal processing of the combiner.

14. The method of claim 12 wherein the step of performing symbol rate multiplying and accumulating includes the steps of:

multiplying a first signal from a finger front end of the plurality of finger front ends or the storage device with a second signal from a finger front end of the plurality of finger front ends or the storage device to produce a product signal;

adding the product signal or the second signal to a feedback signal to produce a sum signal; and limiting the sum signal to a predetermined range to produce a limited sum signal;

normalizing the limited sum signal to produce a normalized signal; and latching the normalized signal to produce the feedback signal.

15. The method of claim 14 and further including the step of latching the first signal and the second signal.

16. A radio for communicating in a multiple access communication system, the radio comprising:

a controller for controlling the radio;

a receiver for receiving a plurality of spread spectrum radio signals; and a demodulator, coupled to the controller and the receiver, for demodulating the radio signal, the demodulator comprising:

a plurality of finger front ends, each front end receiving spread signals and performing chip rate signal processing associated with the spread spectrum demodulator;

a buffer, coupled to the plurality of finger front ends, for buffering per symbol accumulated data vectors;

a storage device for maintaining state information associated with symbol rate signal processing of the spread spectrum demodulator;

an arithmetic datapath, coupled to the storage device and the buffer, for performing symbol rate multiply and accumulate functions associated with signal processing of the spread spectrum demodulator, the arithmetic datapath having a symbol output;

a datapath control circuit, coupled to the arithmetic datapath, for arbitrating the use of the arithmetic datapath among the plurality of finger front ends;

a searcher front end, coupled among the plurality of received spread signals and the arithmetic datapath, for calculating signal energy of the received spread signals; and a symbol combiner, coupled to the arithmetic datapath, for combining the symbol output into a demodulated symbol stream.

17. A method for spread spectrum demodulation in a multiple access communication system, the method comprising the steps of:

receiving spread signals by a plurality of finger front ends;

performing chip rate signal processing, associated with a spread spectrum demodulator, on the received spread signals;

buffering per symbol accumulated data vectors of the received spread signals;

saving state information associated with symbol rate signal processing of the spread spectrum demodulator;

performing symbol rate multiplying and accumulating functions associated with signal processing of the spread spectrum demodulator to provide a symbol output;

arbitrating and sequencing the symbol rate multiplying and accumulating among the plurality of finger front ends; and combining the symbol output to generate a demodulated signal.

* * * * *